US011216605B2

(12) United States Patent
Osburn et al.

(10) Patent No.: US 11,216,605 B2
(45) Date of Patent: Jan. 4, 2022

(54) INTERACTIVE SYSTEM FOR GUIDING ELECTRONICS DESIGN AND ASSEMBLY

(71) Applicant: S3 Fuzion, Inc., Tigard, OR (US)

(72) Inventors: Edward Paul Osburn, Tigard, OR (US); Ian James Cain, Roseville, CA (US)

(73) Assignee: S3 Fuzion, Inc., Tigard, OR (US)

( * ) Notice: Subject to any disclaimer, the term of this patent is extended or adjusted under 35 U.S.C. 154(b) by 0 days.

(21) Appl. No.: 17/024,567

(22) Filed: Sep. 17, 2020

(65) Prior Publication Data

US 2021/0081588 A1 Mar. 18, 2021

Related U.S. Application Data

(60) Provisional application No. 62/901,588, filed on Sep. 17, 2019.

(51) Int. Cl.
*G06F 30/31* (2020.01)
*G06F 115/12* (2020.01)
*G06F 111/02* (2020.01)

(52) U.S. Cl.
CPC .......... *G06F 30/31* (2020.01); *G06F 2111/02* (2020.01); *G06F 2115/12* (2020.01)

(58) Field of Classification Search
CPC ...................................................... G06F 30/31
USPC ........................................................ 716/139
See application file for complete search history.

(56) References Cited

U.S. PATENT DOCUMENTS

| 8,516,433 B1 * | 8/2013 | McCracken | G06F 30/34 |
| | | | 716/138 |
| 2007/0192755 A1 | 8/2007 | Regnier | |
| 2008/0005713 A1 | 1/2008 | Singh et al. | |
| 2008/0307373 A1 | 12/2008 | Kobayashi | |
| 2011/0066992 A1 * | 3/2011 | Sandy | G06F 30/30 |
| | | | 716/122 |
| 2016/0012171 A1 * | 1/2016 | Visconti | G06F 30/392 |
| | | | 716/122 |
| 2018/0011958 A1 | 1/2018 | Irissou et al. | |

OTHER PUBLICATIONS

Korean Intellectual Property Office, International Search Report and Written Opinion of the International Searching Authority, dated Dec. 30, 2020, in PCT/US2020/51310 which is the international application which shares the same priority as this U.S. application.

* cited by examiner

*Primary Examiner* — Eric D Lee
(74) *Attorney, Agent, or Firm* — Kolitch Romano LLP

(57) ABSTRACT

A computer implemented method is disclosed relating to the design of electronic circuits and systems. In some examples, a graphical user interface is utilized to receive first information relating to a requested electronic circuit. The first information includes a selected type of electronic circuit and one or more operating criteria relating to requested fundamental functionality of the selected type of electronic circuit. Second information is also received, relating to requested secondary attributes of a hypothetical candidate electronic circuit that satisfies the first information. In response, a set of candidate circuit architectures are displayed satisfying the first information, as well as a visualization of how each of the candidate circuit architectures relates to the second information.

20 Claims, 18 Drawing Sheets

US 11,216,605 B2

INTERACTIVE SYSTEM FOR GUIDING ELECTRONICS DESIGN AND ASSEMBLY

CROSS-REFERENCES

The following applications and materials are incorporated herein, in their entireties, for all purposes: U.S. Provisional Patent Application Ser. No. 62/901,588, filed Sep. 17, 2019

FIELD

This disclosure relates to systems and methods for guiding electronics design and development. More specifically, the disclosed embodiments relate to a design aid for electronics and distributed framework for hosting a suite of applications relating to the design of electrical and electronic systems.

INTRODUCTION

The traditional development process for designing digital and analog electronics often begins with thorough research on component selection. The process of selecting components substantially increases the development time due to the vast selection and performance differences of all available components. As more time is spent on component research, a designer may need to sacrifice time spent on validation and integration of the final product. Additionally, as the design process continues, refining of the design through testing, validation, and integration may elicit a change in components that can be costly and time consuming.

SUMMARY

The present disclosure provides systems, apparatuses, and methods relating to guiding electronics design and development.

In some embodiments, a computer implemented method for electronics design may include: receiving, via a graphical user interface (GUI), first information relating to a requested electronic circuit, the first information including a selected type of electronic circuit and one or more operating criteria relating to requested fundamental functionality of the selected type of electronic circuit; receiving, via the GUI, second information relating to requested secondary attributes of a hypothetical candidate electronic circuit that satisfies the first information; displaying, via the GUI, a set of candidate circuit architectures satisfying the first information, and a visualization of how each of the candidate circuit architectures relates to the second information; receiving, via the GUI, a user selection from the set of candidate circuit architectures to define a selected circuit architecture; and displaying, via the GUI, detailed information regarding the selected circuit architecture, including a simulation of electronic behavior of the selected circuit architecture and a listing of specific components included in the selected circuit architecture.

In some embodiments, a data processing system for designing electronics may include: one or more processors; a memory; and an electronics design program including a plurality of instructions stored in the memory and executable by the one or more processors to: receive, via a graphical user interface (GUI), first information relating to a requested electronic circuit, the first information including a selected type of electronic circuit and one or more operating criteria relating to requested fundamental functionality of the selected type of electronic circuit; receive, via the GUI, second information relating to requested secondary attributes of a hypothetical candidate electronic circuit that satisfies the first information; display, via the GUI, a set of candidate circuit architectures satisfying the first information, and a visualization of how each of the candidate circuit architectures relates to the second information; receive, via the GUI, a user selection from the set of candidate circuit architectures to define a selected circuit architecture; and display, via the GUI, detailed information regarding the selected circuit architecture, including a simulation of electronic behavior of the selected circuit architecture and a listing of specific components included in the selected circuit architecture.

Features, functions, and advantages may be achieved independently in various embodiments of the present disclosure, or may be combined in yet other embodiments, further details of which can be seen with reference to the following description and drawings.

DETAILED DESCRIPTION

Figure 1:
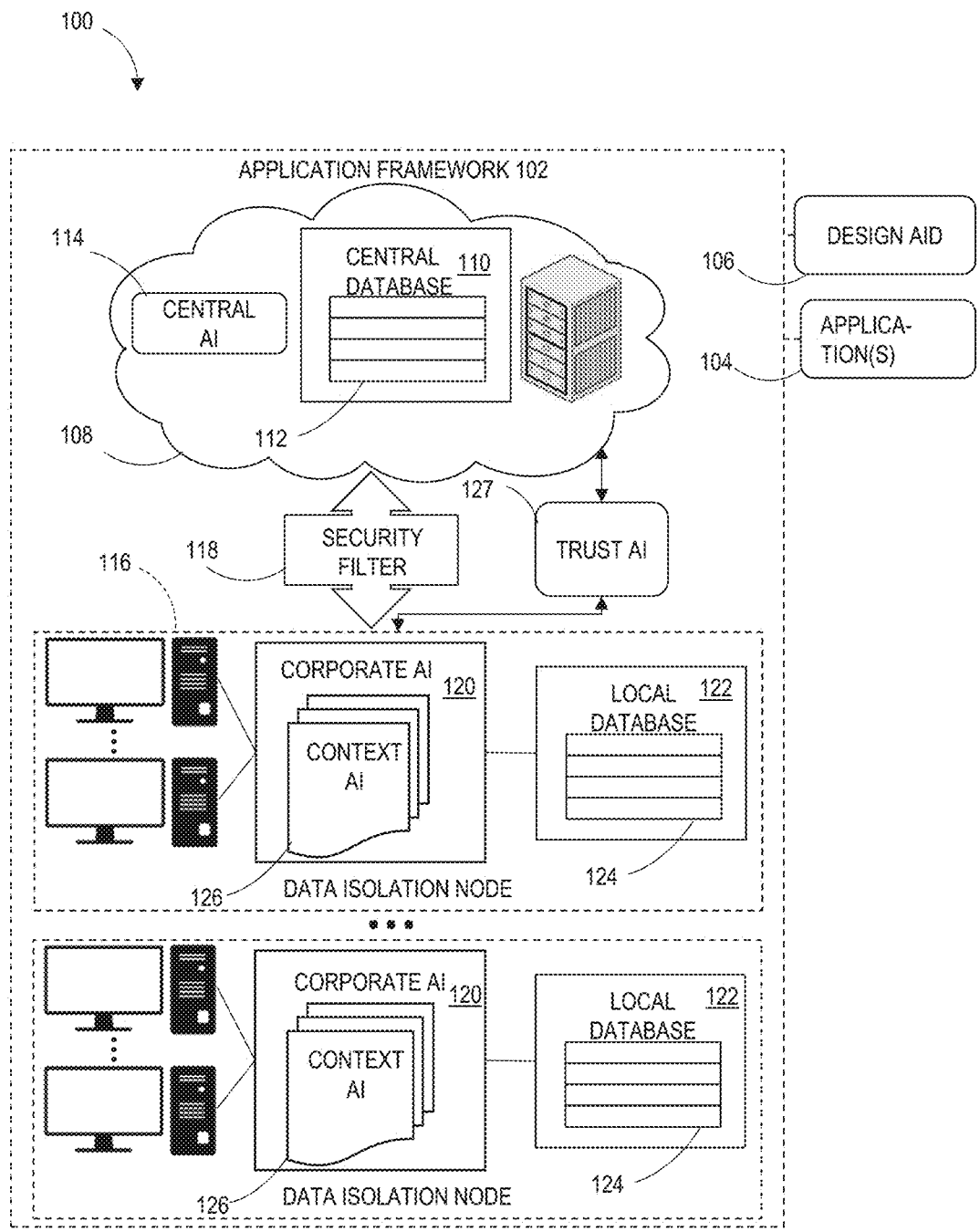
FIG. 1 is schematic view of an illustrative interactive system for guiding electronics design and assembly.

Various aspects and examples of an interactive system for guiding electronics design and assembly are described below and illustrated in the associated drawings. Unless otherwise specified, an interactive system to aid in the design of electronics accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"AI" means "artificial intelligence" and may be used to indicate a machine learning model, adaptive learning model, evolutionary/genetic algorithm, and/or any other artificial system configured to behave in a manner analogous to human intelligence.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware. "Assembly" means an electronics circuit or arrangement of hardware comprising passive and/or active electronics components.

When discussing electrical and electronic circuits and their components: "V" indicates volts; "A" indicates amps, "AC" indicates alternating current; "PCB" indicates printed circuit board; and "DC" indicates direct current.

"UI" means user interface, and "GUI" means graphical user interface, each of which is an example of a human-machine interface, or HMI.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an interactive system for guiding electronics design and development according to the present disclosure includes (1) a distributed framework for hosting a suite of applications developed to aid in the design of electronics systems and devices and (2) an electronics design aid that utilizes the distributed framework and communicates with the applications hosted on the distributed framework. The distributed framework comprises a cloud service that includes a central database and a central AI module. The distributed framework is configured to provide data from the central database. The framework is also configured to provide categorization and learning from the central AI module to the electronics design aid and hosted applications. The electronics design aid is configured to model electronics assemblies, recommend components, and adapt to (and learn from) users. Various AI modules may be incorporated, such as a context AI module, a corporate AI module, and a trust AI module, all of which are described further below.

The central database is configured to host data (e.g., in the form of datasheets) corresponding to components that may be provided by manufacturers and/or users. Datasheets and other data structures hosted on the database may be analyzed by processing logic (e.g., configured to utilize optical character recognition) to determine and/or categorize any information contained therein, such as component specific values (e.g., resistance, capacitance, inductance, etc.), operating conditions and/or constraining conditions (e.g., operating temperatures, minimum/maximum current, etc.), as well as any analytical information (e.g., clock cycles, duty cycles, mathematical functions, etc.). The information gathered by the processing logic may be stored, e.g., in the central database.

In addition to the central database, the distributed framework is configured to host a suite of third-party applications. A third party may provide a tool configured to aid in the design of electronic assemblies, and the framework is configured to seamlessly integrate the tool into its operating structure. The third-party tool may access the information contained in the database and be utilized in combination with any other applications hosted in the framework. In this manner, the third-party tool may function as a "plugin" to the framework and may be used as a part of the overall system.

In some examples, the distributed framework utilizes processing logic to combine data from a selected plurality of components in the database and provide an estimation of performance for the combination of those components. For example, the processing logic may calculate the output of a circuit containing multiple components, connected in a given arrangement, when provided a specific input.

In some examples, the electronics design aid includes processing logic configured to receive as input a desired behavior for an electronic circuit (e.g., a specific input and a desired output) and in response to generate a collection of components and configurations that provide the desired behavior. The components and configurations provided may be categorized by several metrics, including cost, performance, availability, and/or the like. The categorization may function as a list of recommendations, a ranked list, an ordered list, an unordered list, and/or the like. For example, a designer user may provide a set of criteria, such as an input voltage and desired output voltage, along with a set of operating conditions, such as a maximum operating temperature. In this example, the electronics design aid then provides a list of one or more candidate components and configurations that provide the desired output voltage within the operating temperature.

In some examples, the electronics design aid utilizes a context AI module configured to adaptively learn how a user interacts with the interactive system. A generic, default profile may be assigned to new users that allows for simple use of the interactive system. As the user spends more time interacting with the interactive system, the context AI module will use the user's interactions as training data to categorize the user, and to learn and adapt to the user's trends and development patterns. This may include adapting the user interface to hide unused features, recommending components from the most-used manufacturers, recommending components based on development patterns, etc., based on previous user interactions.

In conjunction with the context AI module, the electronics design aid in some examples utilizes a corporate AI module that is configured to learn from a group of users working for the same entity. The corporate AI module communicates with each context AI module and aggregates the data to learn entity-wide trends, preferences, etc. The corporate AI module is a parent node to the respective context AI modules that are aggregated.

In some examples, the corporate AI modules from all entities utilizing the electronics design aid are further aggregated into a central AI module. The central AI module communicates with each of the corporate AI modules to learn global trends in the electronics market as well as manufacturer-specific trends in reliability and availability across the market.

Utilizing the data from the context AI, corporate AI, and/or central AI modules, the electronics design aid in some examples employs a trust AI module that is trained to assign one or more trust values to each manufacturer, based on historical performance and other data. The trust AI module recognizes both short-term and long-term trust values depending on several factors, including availability of components, reliability of components, customer approval, frequency of use, availability of component information, certified designs, and level of customer support.

Aspects of the interactive system, including both the electronics design aid and the distributed framework, may be embodied as a computer method, computer system, or computer program product. Accordingly, aspects of the interactive system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the interactive system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the interactive system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the interactive system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the interactive system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of an exemplary interactive system for guiding electronics design and assembly as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Interactive System

As shown in FIG. 1, an interactive system 100 according to the present teachings includes a distributed framework 102 configured to receive external software applications 104 and/or an electronics design aid 106, each configured to utilize components of distributed framework 102. External software applications 104 may be developed specifically for use with distributed framework 102 and/or may be developed by a third-party entity, e.g., provided as an external plugin for use with distributed framework 102. Distributed framework 102 may utilize external applications 104, individually or in combination with each other. In some examples, external applications 104 are in communication with each other only via distributed framework 102. For example, electronics manufacturers may develop their own third-party design tools for use with distributed framework 102, e.g., to provide aid in the use of their components. In that example, distributed framework 102 is configured to enable the third-party design tools to work in ensemble with other applications 104 in the framework.

Distributed framework 102 comprises a cloud system 108 having a central database 110. Central database 110 is partitioned into a plurality of central data channels 112. Each member of the plurality of central data channels 112 is configured to contain data (e.g., operating conditions, tolerances, component specific data, etc.) on components that has been input, downloaded, uploaded, and/or saved based on data from manufacturers, users, datasheets, and/or other data sources. In some examples, the data in central database 110 is provided in part by a community of users in an open-source capacity, such that each user can provide data and check the validity of data provided by other users. In some examples, the data in central database 110 is provided by a subset of users having database-editing rights. In some examples, the data in central database 110 is provided only by the manufactures and/or distributors of the respective components. In some examples, the data in central database 110 is provided by a mixture of manufacturers, distributors, and users. In some examples, at least some of the data is read in digitally, e.g., from datasheets, utilizing optical character recognition (OCR).

Central data channels 112 are partitioned in such a way that the information on each data channel 112 is related (e.g., by component type, component function, application, manufacturer, etc.). Partitioning central database 110 into central data channels 112 facilitates faster data transfer and less strain on a distribution network. For example, a user working on an application requiring data solely from a single data channel 112, can forego transferring data from other data channels. In one example, central data channels 112 may be partitioned such that the most commonly used components for a selected design application (e.g., power engineering) are stored together in one data channel 112.

Cloud system 108 includes a central AI module 114. Central AI module 114 is configured to learn and/or categorize long-term and short-term trends in the electronics industry on a global and/or regional scale by training on an aggregation of data hosted on distributed framework 102, such as data associated with electronics design aid 106 and external applications 104 from a plurality of unique entities (e.g., corporations, companies, engineering groups).

In some examples, central AI module 114 is configured to learn trends regarding the global prevalence of purchasing from specific manufacturers. In some examples, central AI module 114 is configured to train on decisions made by users interacting with electronics design aid 106, such as component preferences, orders of operations, manufacturer preferences, etc. In some examples, central AI module 114 is configured to identify changes in the use of certain components on a global scale. In this manner, central AI module 114 is configured to evaluate the successes and failures of certain products, both technically and commercially.

Cloud system 108 is in network communication with a plurality of data isolation nodes 116. Data isolation nodes 116 may be representative of a specific company, engineering group, or corporate entity. The network communication between distributed framework 102 and data isolation nodes 116 is passed through a security filter 118 that ensures a secure isolation of each node 116. Security filter 118 may utilize encryption algorithms such as symmetric-key algorithms (e.g., Advanced Encryption Standard (AES)), asymmetric-key algorithms (e.g., Rivest-Shamir-Adelman (RSA)), and/or other encryption algorithms. Security filter 118 allows for cross-company analysis of the industry by central AI module 114 without compromising the security of any individual company. This facilitates a global aggregate of industry knowledge that can be used in analyzing manufacturer reliability as well as changes in development across the entire electronics design industry.

Each data isolation node 116 includes a distributed corporate AI module 120 configured to be in communication with a plurality of individual instances of electronics design aid 106. Each instance of electronics design aid 106 is configured to be utilized by individual members of a single entity, however defined (e.g., a company, engineering group, corporate entity, etc.).

The distribution of corporate AI module 120 across each instance of electronics design aid 106 forms a distributed AI network configured to learn trends of all members of the entity. Distributed corporate AI module 120 is configured to be a collective monitoring system that analyzes choices (e.g., preferences, component use, manufacturer preferences) of each member in the entity. Distributed corporate AI module 120 aggregates data from each instance of electronics design aid 106 and is trained on the data to establish collective information on the entire entity. Corporate AI module 120 learns and determines which components should be recommended for certain applications, based on the overall usage of those components by the entity. The collective information gathered by a plurality of corporate AI modules 120 (each member of the plurality being from a different entity), is analyzed by central AI module 114 to determine the global trends in the industry.

Each instance of electronics design aid 106 utilized by an individual user (e.g., engineer, systems designer, technician) of a specific entity may be in network communication within a data isolation node 116 with each other entity-specific instance of electronics design aid 106. Each instance of electronics design aid 106 can access central database 110 and duplicate specific central data channels 112 into a local database 122 having local data channels 124. Local database 122 may be stored in local memory on an individual user's computer to decrease the strain on the network. Local data channels 124 may contain only the components that are used by the user. For example, if the user is a power engineer, local data channels 124 stored in the user's local database 122 may contain only the components that are most useful for power applications.

Each instance of electronics design aid 106 has a user-specific context AI module 126. Context AI module 126 is configured to learn the usage trends of an individual user. Context AI module 126 may update the personal experience the user has when interacting with electronics design aid 106. For example, context AI module 126 may learn the most common components selected by the user and communicate to electronics design aid 106 to display them first. Additionally, or alternatively, context AI module 126 may categorize the user by experience level (e.g., novice, expert, etc.) and adaptively change aspects of electronics design aid 106 accordingly. Each context AI module 126 is in network communication with corporate AI module 120 to provide the data for aggregation, as described above.

Interactive system 100 includes a trust AI module 127 in communication with cloud system 108 and the plurality of data isolation nodes 116. Trust AI module 127 is configured to learn in conjunction with each of the AI modules, context AI module 126, corporate AI module 120, and central AI module 114, to generate a trust value for each manufacturer dependent on a collection of trust factors.

The trust factors utilized by trust AI module 127 may include availability, such as past and present inventory presence, component manufacturing trends (e.g., whether overall production is increasing or decreasing), inventory levels of distribution channels, trends in distribution, and others. The trust factors may also include reliability, such as component specific quarantines and rejections, quantity of component errors, severity of component errors, recency of component errors, and others. The trust factors may also include customer approval ratings, such as relative acceptance of component in final design, usage statistics, customer ratings, and others. The trust factors may also include certified designs and common designs, including the rate of use/adoption of the certified and common designs. The trust factors may also include information availability for each component, such as depth of detail in datasheets, amount of testing information, depth of testing information, and quality of information for a component. The trust factors may also include level of support services, such as ease of contact, type of support contact (e.g., email, phone, office, support center), quality of support, timeliness of support, and others. The trust factors may also include any other custom and/or multi-source feedback on a manufacturer including $3^{rd}$ party rankings, standard acceptance, unique products, environmental footprints, etc.

Figure 2:
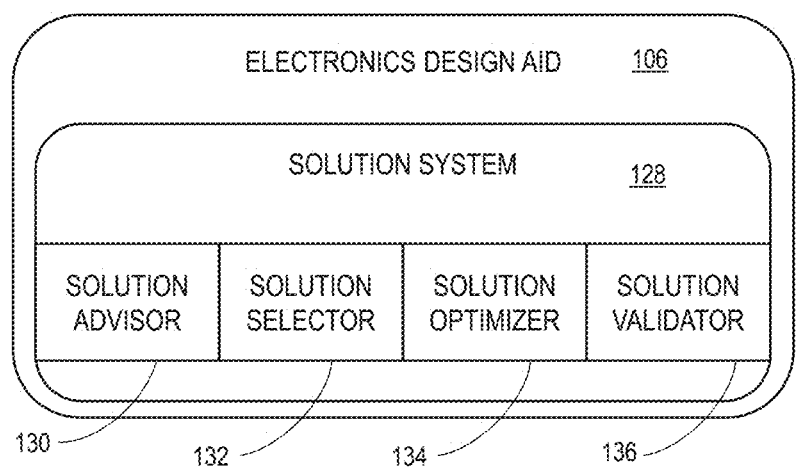
FIG. 2 is a schematic view of an illustrative electronics design aid.

Turning now to FIG. 2, electronics design aid 106 includes a solution system 128 configured to generate one or more relevant electronic assemblies and associated analyses depending on a provided set of requirements from the user. Solution system 128 comprises the following elements: a solution advisor 130, a solution selector 132, a solution design optimizer 134, and a solution validator 136. Each of these elements is discussed further below.

Solution system 128 is configured to provide detailed analysis and design choices for the development of electronic circuits and assemblies when given an input from a user. Each element in solution system 128 may contribute to an overall reduction in development costs and an accelerated development cycle. More specifically, solution system 128 is generally configured to facilitate the following steps (see FIG. 3 and see also the associated method described in Section B):

1. Primary operating criteria are established by a user. For example, if developing a DC-DC power converter, primary operating criteria may include input voltage, output voltage, output current, and grade (e.g., tolerance, reliability, etc.).

2. Solution system 128, with or without feedback from the various levels of AI module described above, outputs a list of potential components and respective manufacturers/suppliers.

3. Solution system 128 provides a list of analytical data regarding each component and allows for further selection of auxiliary operating criteria (e.g., operating temperature; electrical tolerances; size, i.e., height and/or area; etc.).

4. As the user chooses a combination of components as suggested by solution system 128, solution system 128 provides real-time analysis of electrical properties of the specific combination of components, as determined by relevant mathematical models.

5. A final (or candidate) combination of components selected by the user is analyzed by solution system 128 to determine overall functionality of the combination and finalize the design.

Solution system 128 includes a solution advisor 130, configured to output electronics architecture options (e.g., electronic circuit schematics). In general, solution system 128 is configured to receive as input one or more "critical needs" as defined by the user. The critical needs may include the basic function of the electronics assembly, the operating conditions, and/or design capacity. For example, if the user is designing a DC-DC converter, the critical needs may include producing a 5V output. The critical needs of the user are application specific.

The options for output of solution advisor 130 include circuit schematics, computer architectures, component suggestions, etc. In some examples, solution advisor 130 outputs a risk assessment for each suggested output. The risk assessment may be accomplished through statistical methods, machine learning, and/or other analytical methods. In some examples, solution advisor 130 includes an option to adaptively expand the option set through settings feedback. For example, if the user selectively introduces limitations to the required design, solution advisor 130 may adaptively change suggested outputs in real-time.

Solution system 128 includes a solution selector 132. Solution selector 132 takes the user's prioritized requirements as input. The prioritized requirements include auxiliary characteristics the user wants to include in the final design. For example, prioritized requirements may include maximum operating temperature, input/output tolerances, size of assembly (height and area), etc. The prioritized requirements may be given by a user or may be generated by an auto selector option produced by one of the AI modules described above. For example, corporate AI module 120 may learn that other power engineers at a company tend to require a maximum operating temperature of 100° C. and generate that as a prioritized requirement with the auto selector option. Solution selector 132 is configured to utilize the user's prioritized requirements to refine the output from solution advisor 130 to include only the options that meet the prioritized requirements. In some examples, the refined output may include an indication of a match level (e.g., how close of a match the component is to the requirements) and related industry preference (e.g., as determined by the trust AI module 127 module).

Solution system 128 includes a solution design optimizer 134. Solution design optimizer is configured to provide the user with a detailed analysis of the components selected by solution selector 132. The detailed analysis may include analyzing operating conditions, component combinations, potential tradeoffs, etc. The detailed analysis may comprise tables, graphs, charts, and/or other data visualizations. Solution design optimizer 134 is configured to present design optimizations, for example influenced or provided by the context AI module 126, corporate AI module 120, and/or central AI module 114. The AI modules learn from industry trends to identify potentially optimal designs and component selections. As a user gains experience using solution system 128 the level of optimization suggestions may change as the context AI module 126 learns how the user interacts with the system. For example, if the user is new to the system, solution design optimizer 134 may suggest optimizations based on the designs of other, more senior, designers (as learned by the context and corporate AI modules). Furthermore, if the user is a senior developer, solution design optimizer 134 may only suggest optimizations based on the industry trends as learned by central AI module 114.

In some examples, solution design optimizer 134 provides the user with an auto-generated design based on the selections of solution selector 132. The auto-generated designs may be generated, for example, through the use of predictive calculations, part favorability, company standards, machine learning, etc. The auto-generated designs may utilize behavioral patterns and industry knowledge from the context AI module 126, corporate AI module 120, and/or central AI module 114 modules to determine an order of parameter optimization.

In some examples, solution design optimizer 134 includes a collaboration mode that enables multiple users to collaborate on optimizing a design. The collaboration mode may provide any participating user the ability to suggest components and/or designs that may be collectively analyzed by solution design optimizer 134 to provide a general optimization approach.

Solution system 128 includes a solution validator 136. Solution validator 136 is configured to analyze the full design of an electronics assembly to ensure the validity and functionality of the design. In some examples, solution validator 136 includes a review and ratification process that finalizes the electronics assembly. In some examples, solution validator outputs a final circuit schematic to an external tool (e.g., CAD) to facilitate a more seamless design flow into other electronics design tools.

B. Illustrative Method

This section describes steps of an illustrative method 300 performed by interactive system 100 for guiding electronics design and assembly. Aspects of distributed framework 102 and electronics design aid 106 described in the previous section may be utilized in the method steps described below. Where appropriate, reference may be made to components and systems that may be used in carrying out each step. These references are for illustration, and are not intended to limit the possible ways of carrying out any particular step of the method.

As described above, interactive system 100 has multiple AI modules that work in concert to guide electronics design and assembly, including electronics design aid 106 having a context AI module 126, trust AI module 127, and a corporate AI module 120 and distributed framework 102 having a central AI module 114.

Electronics design aid 106 of the present embodiment includes solution system 128 configured to receive one or more operating conditions from a user for the development of an electronics assembly/design and characteristics thereof and produce one or more candidate solutions. For example, if the user is developing a DC-DC converter, the operating conditions may include the desired input voltage and desired output voltage. The list of operating condition inputs provided by the user may comprise prioritized requirements and critical needs. In some examples, the input of the operating conditions comprises a guided, step-by-step process enabled by a user interface (UI) of electronics design aid 106.

In some examples, the user is able to choose an assembly from a list of general categories of electronics assemblies (e.g., power systems, signal filters, amplifiers, etc.). The electronics assemblies included in the list of general categories may be adaptive to the design trends of the global industry as learned by central AI module 114. For example, if there is an increased trend of use of a new type of electronic assembly, the list may adapt to include it in the list of general categories.

In some examples, the user is then prompted to choose from a list of sub-types for the chosen general category of electronics assemblies. For example, if a user chooses "power systems" from the list of general categories, electronics design aid 106 may supply a list of power systems such as DC-DC linear regulator, DC-DC buck regulator, flyback converter, etc. For each sub-type that can be chosen, electronics design aid 106 may provide a list of example architectures (i.e. one or more basic circuit schematics) that form the basic sub-type assembly.

After a sub-type is chosen, the user may provide one or more operating criteria referred to as the "critical needs" for the desired electronics assembly. The critical needs include characteristics of the desired electronics assembly that affect the fundamental function of the assembly. The critical needs vary depending on the sub-type that is chosen and further depend on the application the electronics assembly is configured to perform. For example, if the user chooses "DC-DC linear regulator" as a sub-type, electronics design aid 106 may supply critical needs entry fields for input voltage, output voltage, max current output, etc. The type of critical needs entry fields available to the user may change depending on the sub-type chosen (i.e., only the relevant entry fields for a particular sub-type may be shown to the user).

The critical needs are utilized by electronics design aid 106 to generate a list of components that provide the sub-type function within the constraints of the critical needs. The critical needs are also utilized by electronics design aid 106 to limit the list of example architectures to those that are capable of producing sub-type function that conforms to the critical needs of the user.

After the critical needs are input, the user may provide a set of refining criteria referred to as the "prioritized requirements" for the desired electronics assembly. The prioritized requirements include characteristics of the desired electronics assembly that do not change the fundamental function but rather enable more specific customization. Generally speaking, the prioritized requirements are the user's application-specific characteristics such as tolerances, efficiencies, fault protections, etc. For example, if the user chooses "DC-DC linear regulator" as a sub-type, electronics design aid 106 may supply prioritized requirements entry fields for DC tolerance, efficiency, circuit footprint (i.e. maximum size dimension(s)), etc. The type of prioritized requirements entry fields available to the user may change depending on the sub-type chosen (i.e., only the relevant entry fields for a particular sub-type may be shown to the user).

The prioritized requirements are utilized by electronics design aid 106 to curtail the list of solutions generated within the constraints of the critical needs to those that further conform to the prioritized requirements. The prioritized requirements are also utilized by electronics design aid 106 to further limit the list of example architectures to those that conform to the prioritized requirements.

After the list of operating conditions (i.e., critical needs and prioritized requirements) is received by electronics design aid 106, solution system 128, e.g., in conjunction with the AI modules, outputs a list of components and configurations (AKA solutions). The output solutions are those deemed by electronics design aid 106 to conform (or attempting to conform) to the selected operating conditions (i.e., critical needs and prioritized requirements) of the user.

The user may then choose to further customize the electronics assembly according to the specific application. The electronics design assembly may enable the user to adaptively change any component and/or arrangement of components, and to graphically view the resulting behavior of the assembly.

Figure 3:
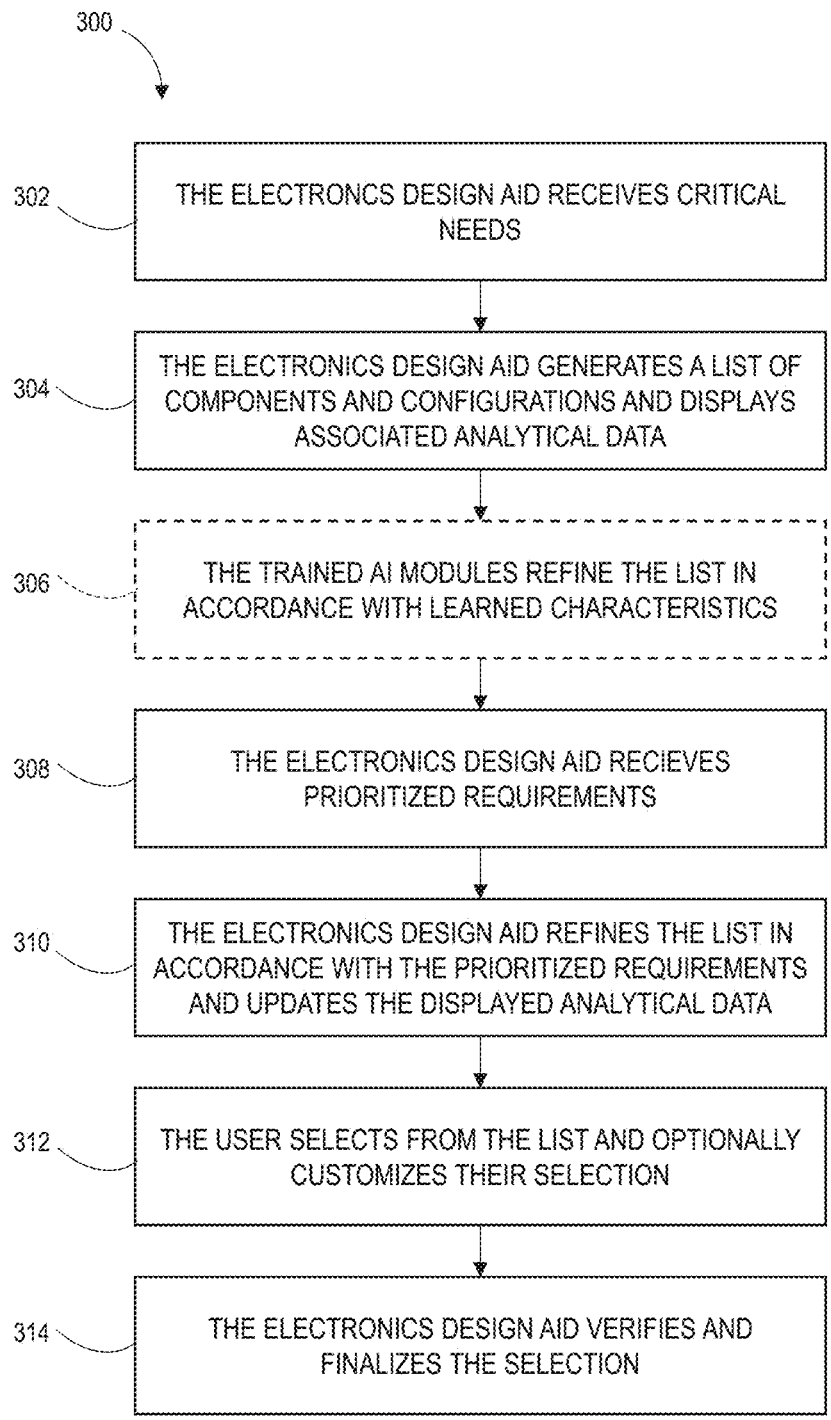
FIG. 3 is a flowchart depicting steps of a method performed by the interactive system.

Turning to method 300 as depicted in FIG. 3, at step 302, critical needs are received by electronics design aid 106. The critical needs may be input by a user on a device such as a computer, laptop, smartphone, tablet, etc. As described above, the critical needs include the general type of electronics assembly desired (e.g., power converter, oscillator, etc.) and the basic operating function of the desired electronics assembly. For example, the critical needs may comprise a DC-DC converter configured to convert a 12V signal to a 1.8V output. In the example depicted in FIGS. 4A and 4B, the critical needs include: a power converter designed to receive a 12V input and convert it to a 1.8V output capable of handling up to 28 A.

At step 304 of method 300, electronics design aid 106 generates and displays a list of possible components and configurations (i.e., electrical assemblies) in accordance with the selected critical needs, and calculates and displays associated analytical data for the components and configurations. The analytical data may include graphs, charts, and/or lists of operating conditions, manufacturing tolerances, efficiency, and other relevant data. The analytical data for the individual components may be retrieved from central database 110 or local database 122. The analytical data for the configurations may be generated in real-time from the component data and relevant mathematical models.

Figure 4A:
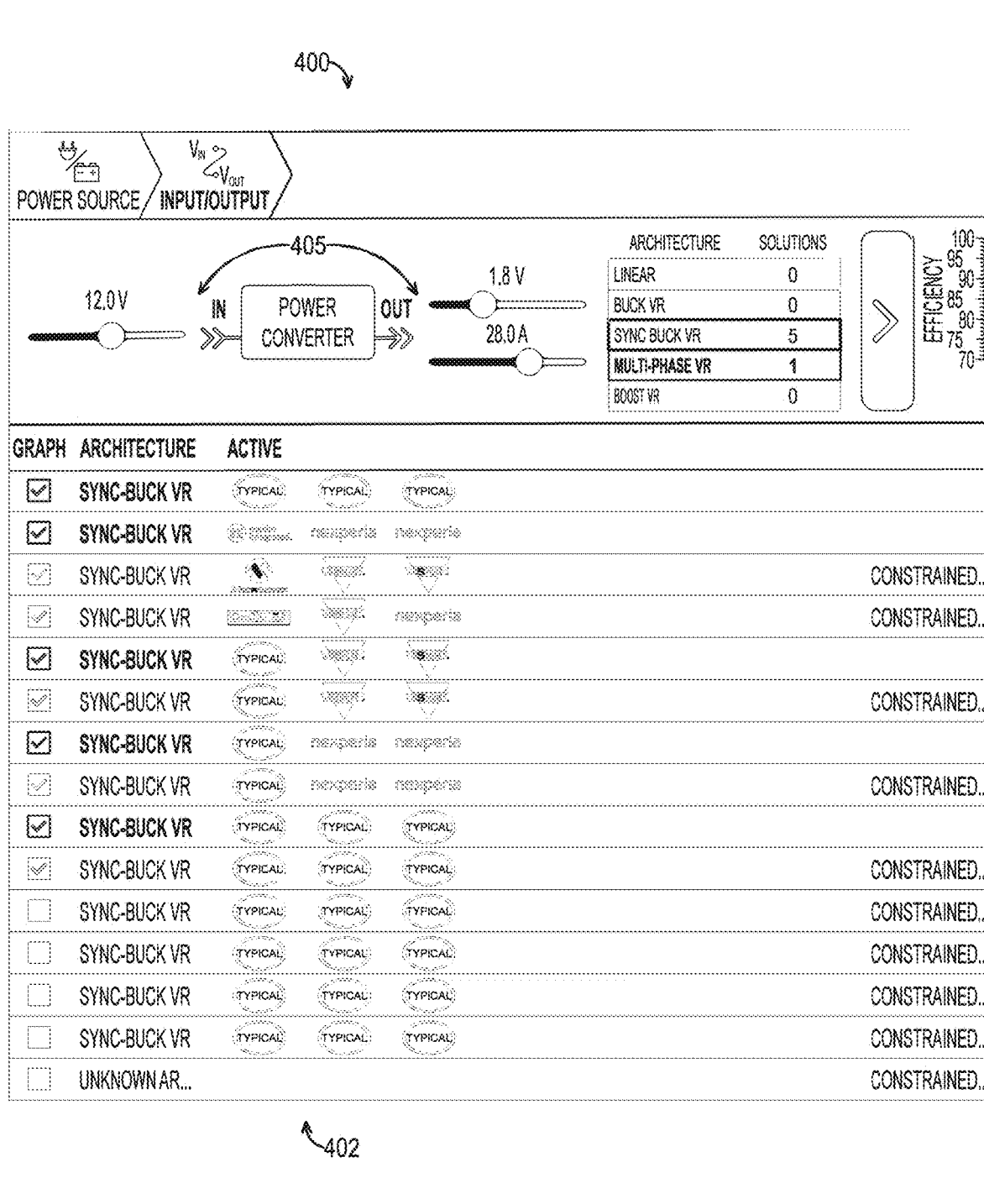
FIG. 4A is a first partial view of an illustrative first user interface configured to carry out steps of the method of FIG. 3.
Figure 4B:
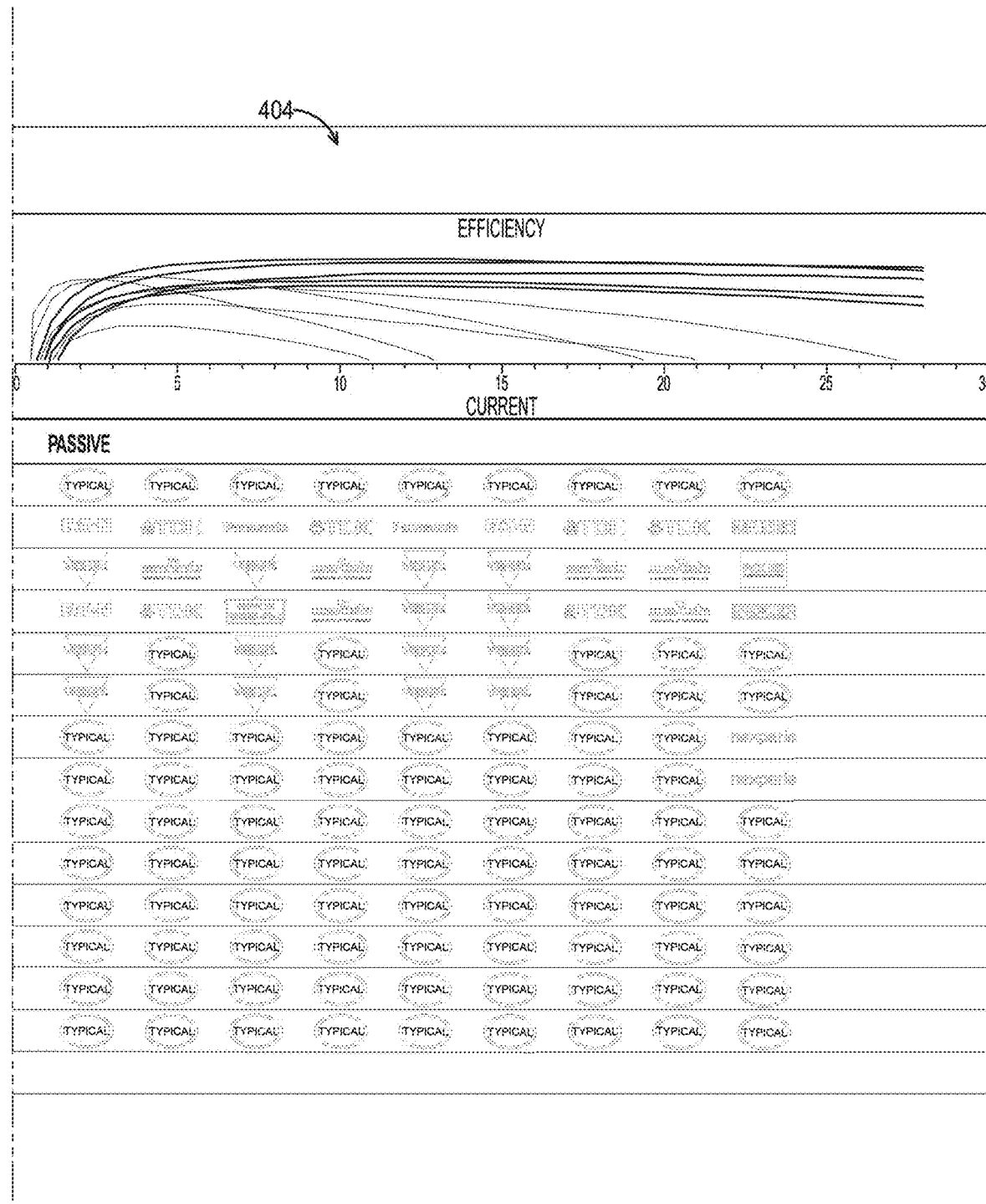
FIG. 4B is a second partial view of the illustrative first user interface.

In the example UI 400 depicted in FIGS. 4A and 4B, electronics design aid 106 has generated a list of possible architectures (AKA solutions) 402 capable of producing the critical needs input by the user, namely five sync buck voltage regulators and one multi-phase voltage regulator. Additionally, electronics design aid 106 has displayed a graph 404 depicting the efficiency of each solution. As shown in the example, the critical needs are input in step 304 with sliders 405—accordingly, list of possible solutions 402 and the accompanying graph(s) are automatically updated when a user changes a slider value.

At optional step 306 of method 300, one or more of the AI modules described above refine the list of possible components and configurations in accordance with any learned characteristics, such as those described above.

Figure 5A:
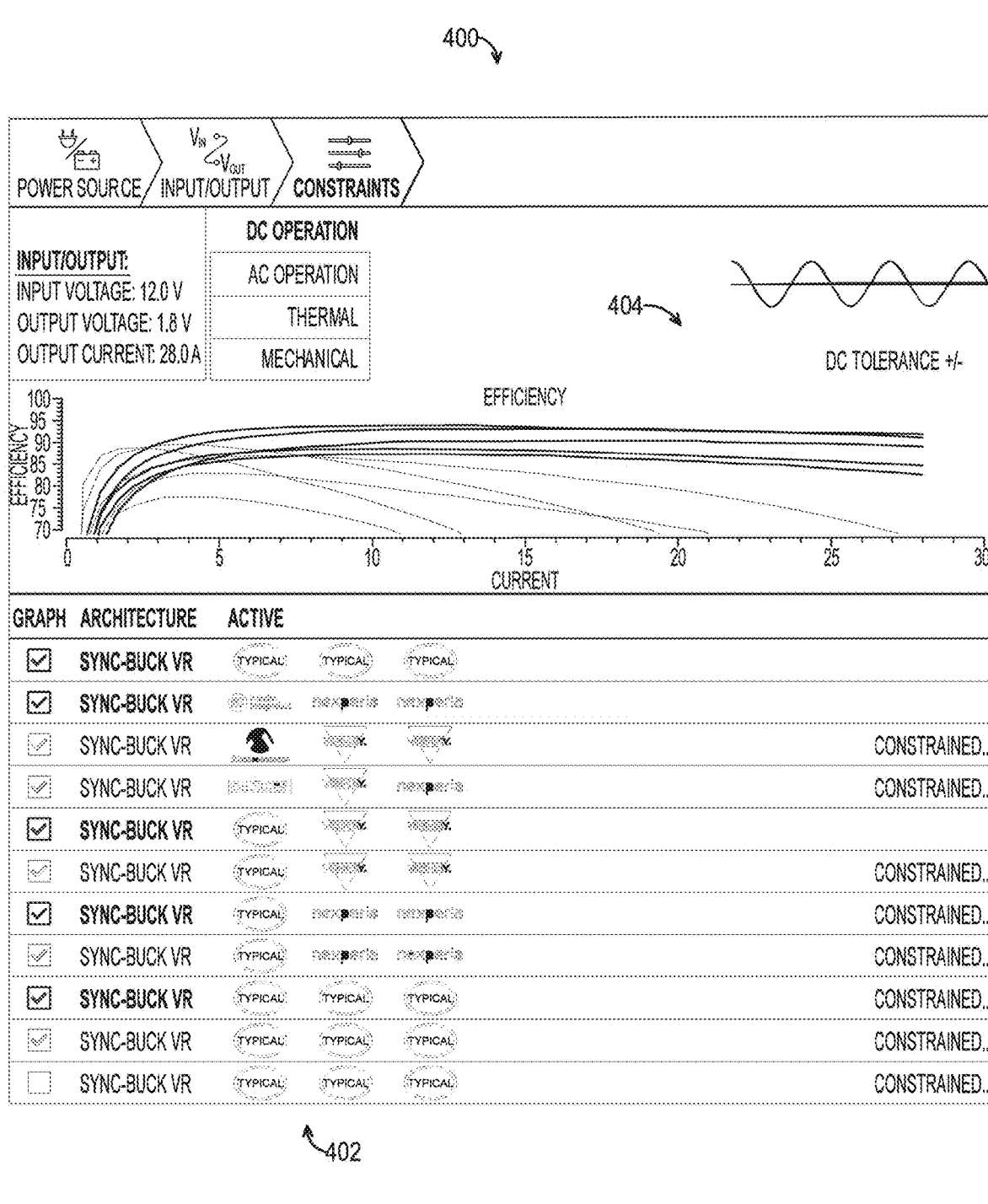
FIG. 5A is a first partial view of an illustrative second user interface configured to carry out steps of the method of FIG. 3.
Figure 5B:
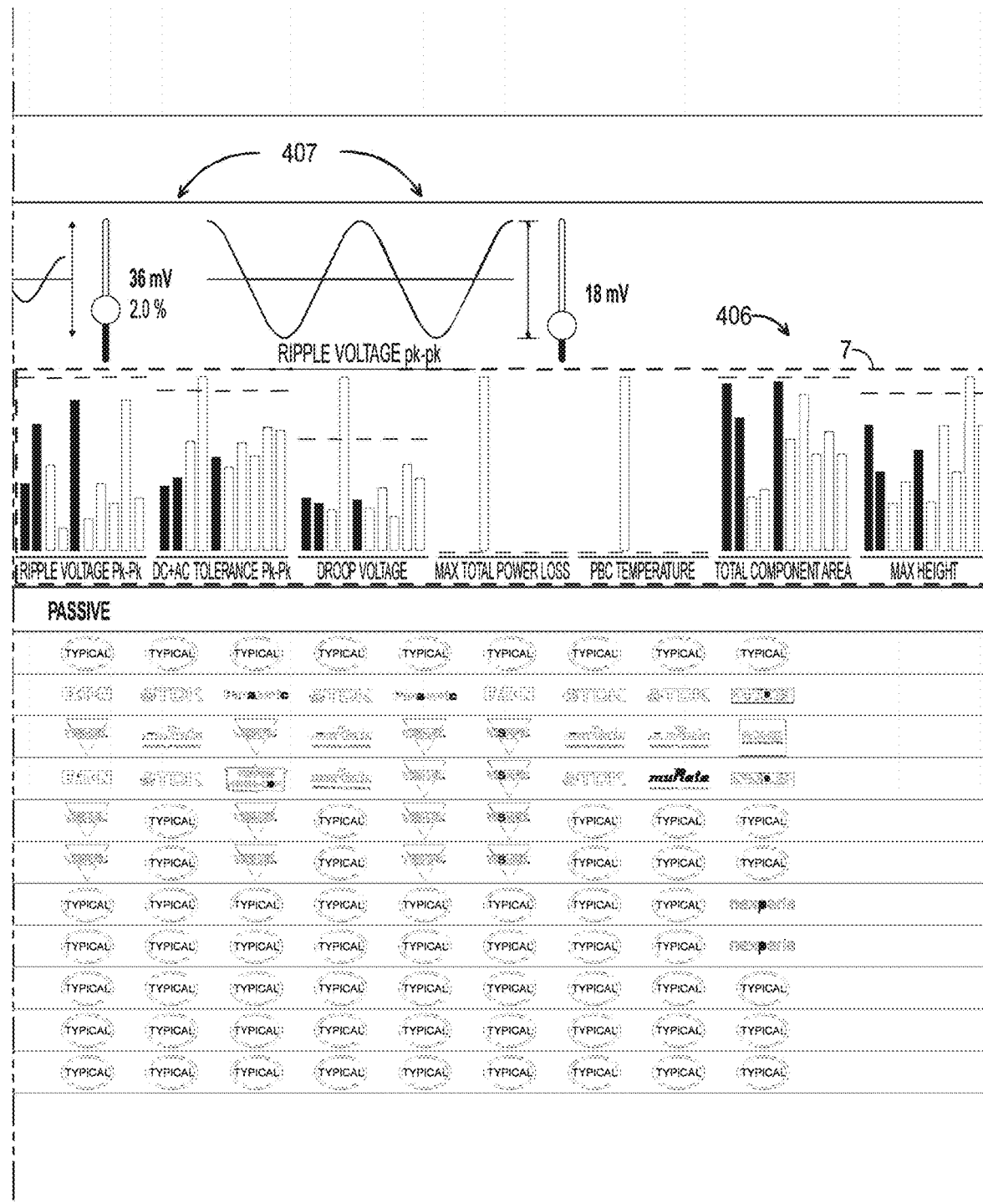
FIG. 5B is a second partial view of the illustrative second user interface
Figure 6A:
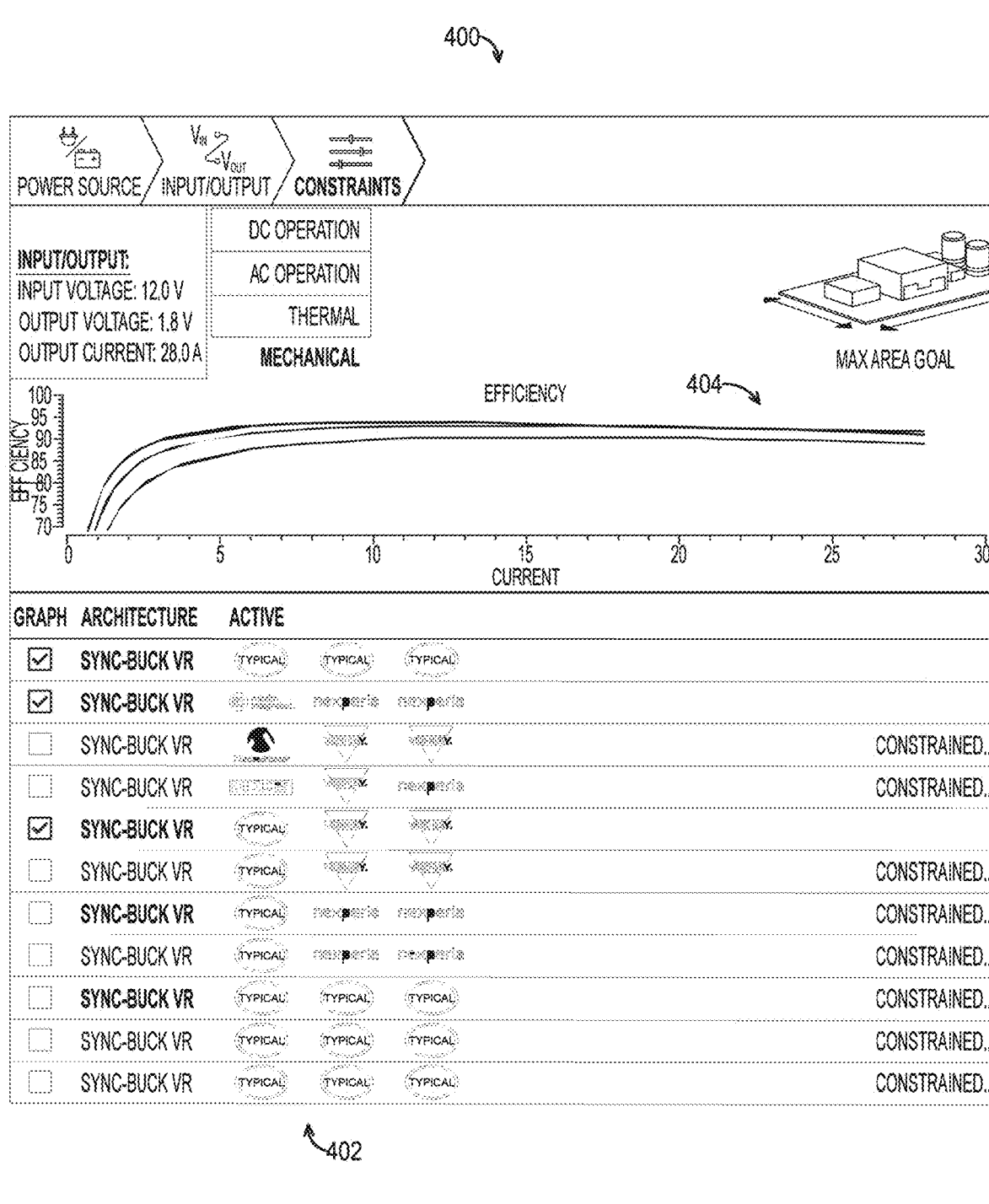
FIG. 6A is a first partial view of an illustrative third user interface configured to carry out steps of the method of FIG. 3.
Figure 6B:
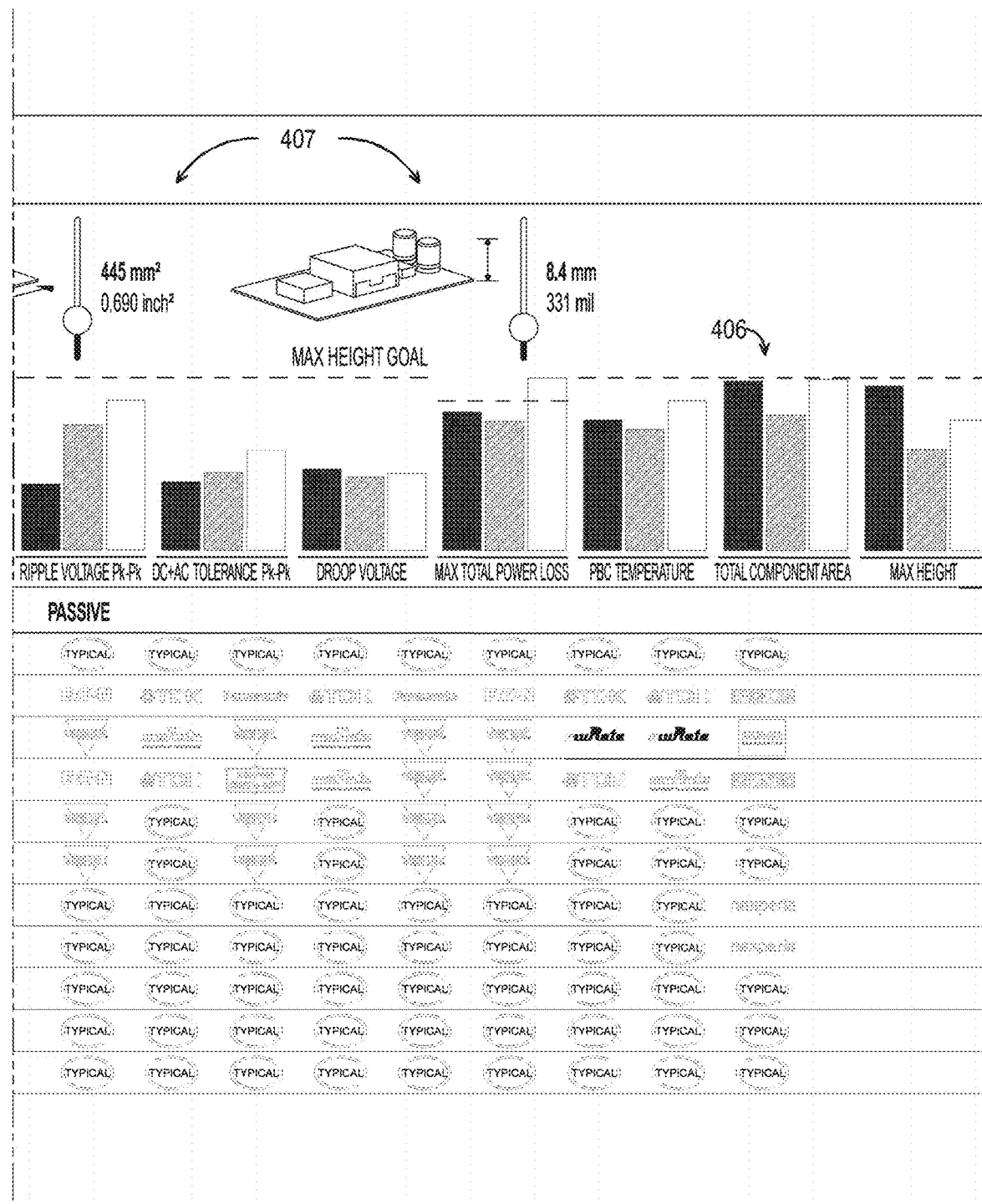
FIG. 6B is a second partial view of the illustrative third user interface.

At step 308 of method 300, prioritized requirements are received by the electronics design aid. The prioritized requirements may be input by the user with sliders 407, as shown in FIGS. 5A and 5B. The prioritized requirements include auxiliary characteristics the user wants to include in the final design. For example, prioritized requirements may include input/output tolerances, size of assembly (height and/or area), etc. In the example depicted in FIGS. 5A and 5B and FIGS. 6A and 6B, the prioritized requirements include DC tolerance, peak to peak ripple voltage, maximum area goal, and maximum height goal.

At step 310 of method 300, electronics design aid 106 refines the list of solutions 402 based on the prioritized requirements provided by the user and accordingly calculates and updates the displayed analytical data including efficiency graph 404 and a visualization in the form of a bar chart section 406, each of the bar charts corresponding to a respective one of the prioritized requirements, and each bar of the bar charts representing a corresponding value associated with each prioritized requirement for a respective one of the solutions from list of solutions 402.

Figure 7:
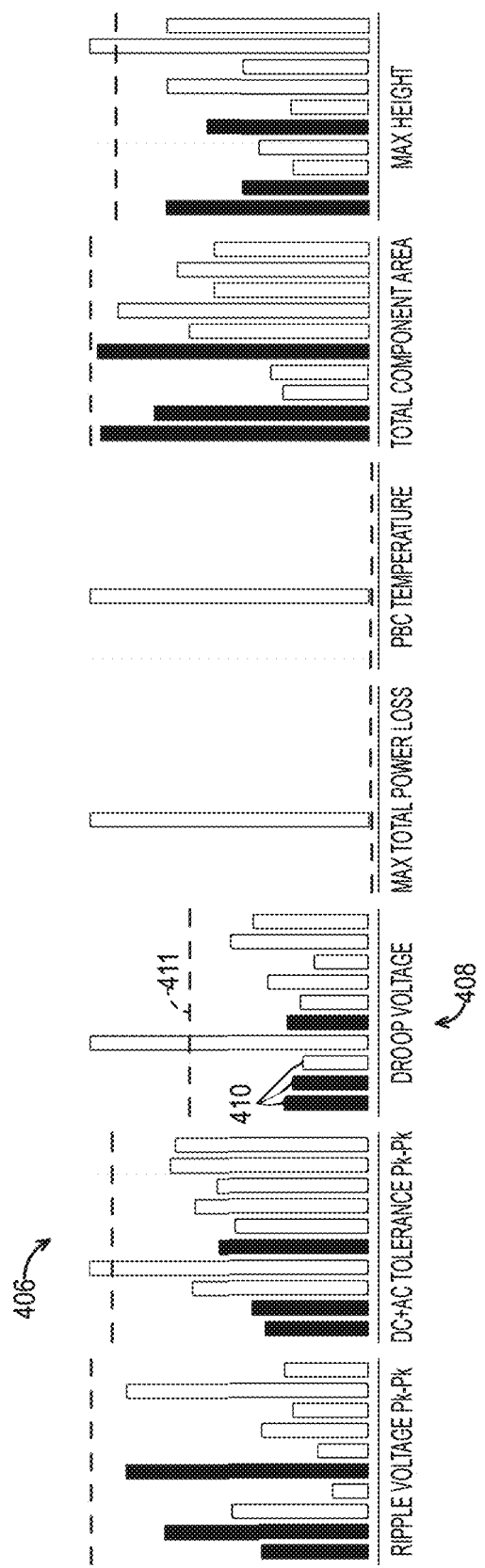
FIG. 7 is a magnified portion of the second user interface.

Turning to bar chart section 406 indicated at 7 in FIG. 5B and shown magnified in FIG. 7, the electronics design aid is configured to show each solution's corresponding values for each of the prioritized requirements in a comparative bar chart format, wherein each bar chart 408 corresponds to a single prioritized requirement and each bar 410 corresponds to a respective solution. The user-specified prioritized requirements received in step 308 are shown respectively as a dashed threshold line 411 above each bar chart 408. This configuration enables the user to quickly and visually reference which solutions conform to each of the prioritized requirements and which solutions fall outside of each of the prioritized requirements.

This UI configuration enables the user to make informed decisions about which solution to choose and when a certain requirement may be relaxed or changed to allow for more advantageous characteristics in other areas. For example, a solution may be just above the threshold for max height but otherwise outperform other solutions in specific (potentially more important) areas, such as droop voltage. The user may choose to adapt their selected requirements with this in mind, for example in this case by relaxing the required maximum height of the housing, thereby including more acceptable options that otherwise improve overall performance.

Figure 8A:
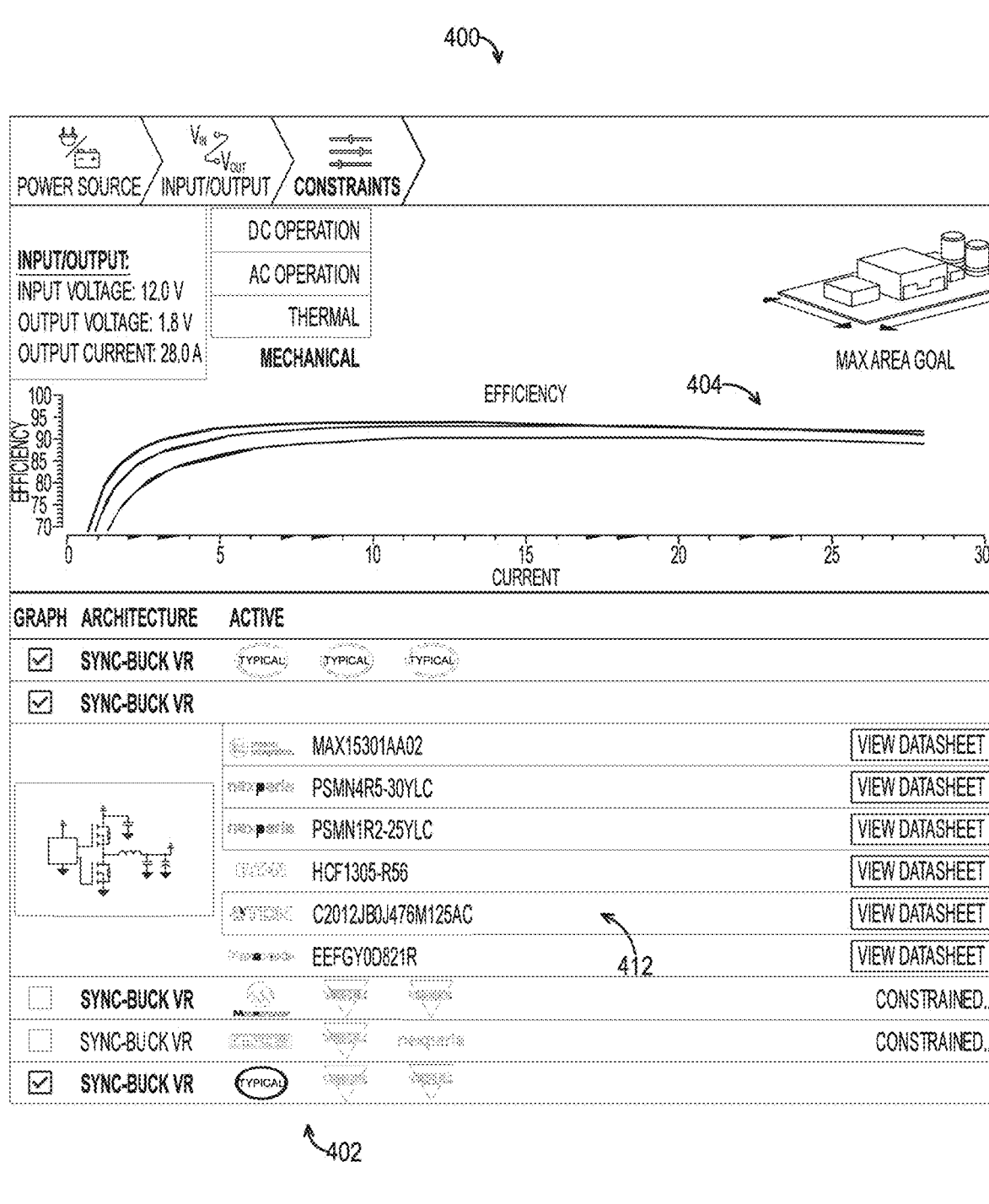
FIG. 8A is a first partial view of an illustrative fourth user interface configured to carry out steps of the method of FIG. 3.
Figure 8B:
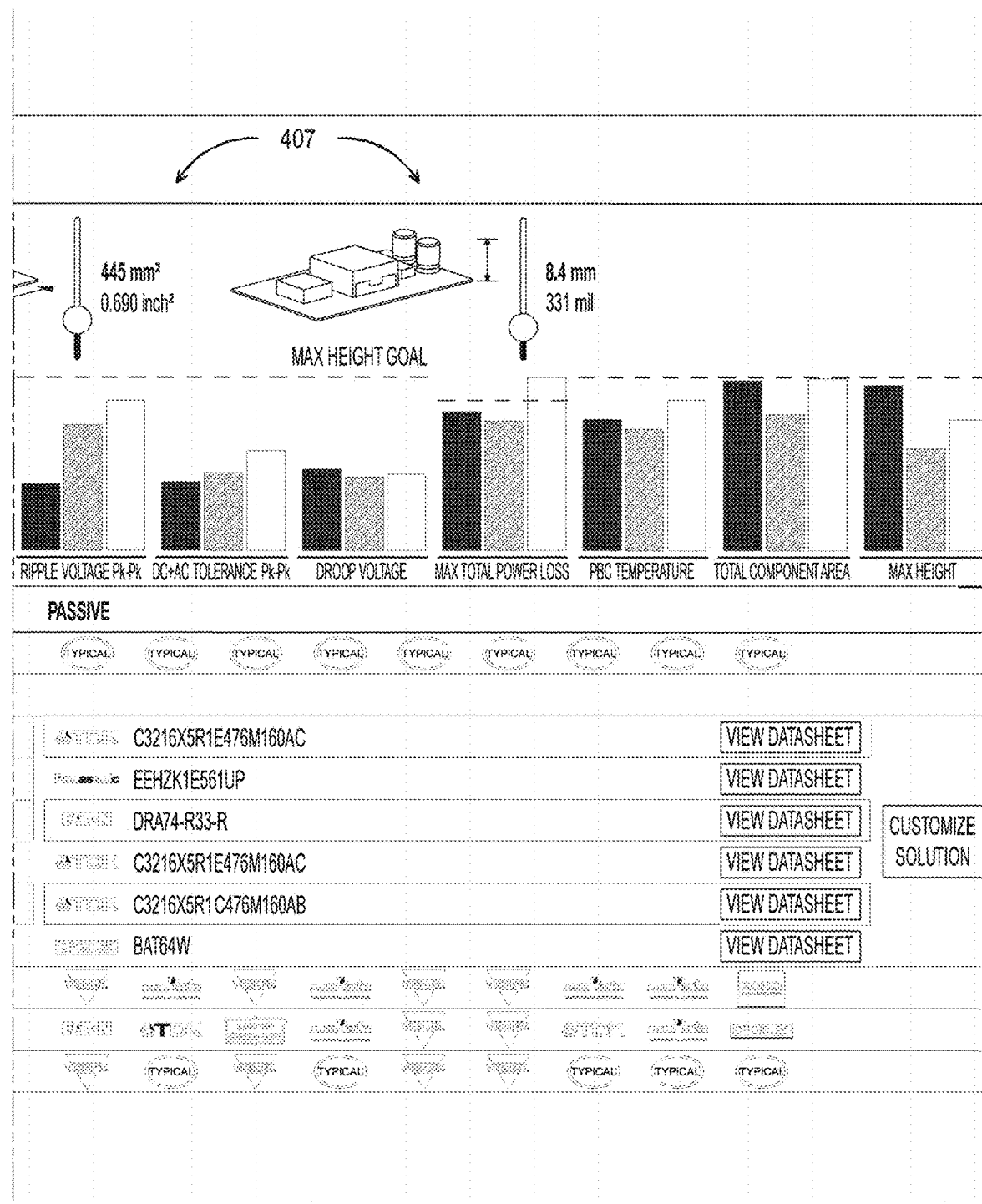
FIG. 8B is a second partial view of the illustrative fourth user interface.
Figure 9A:
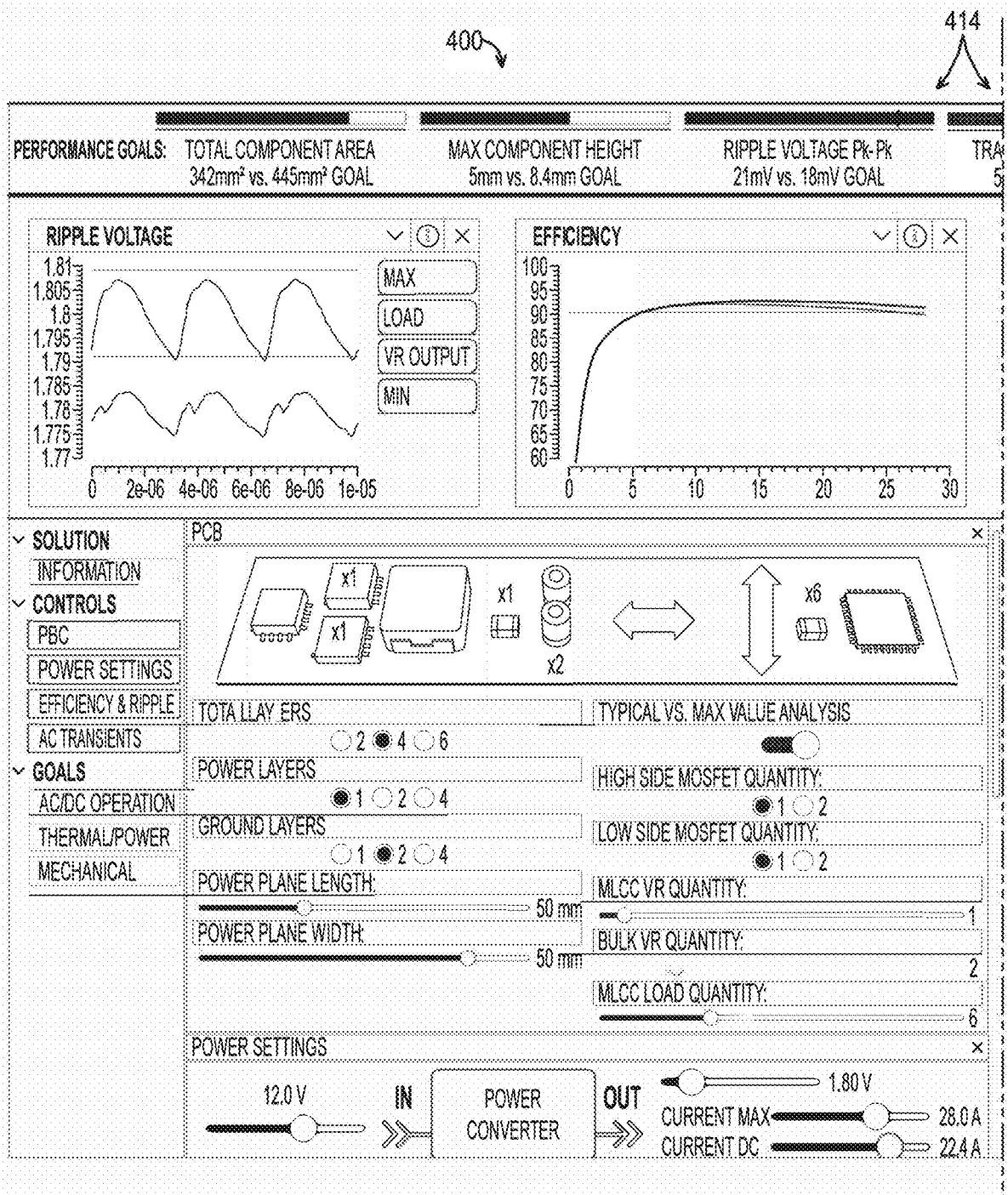
FIG. 9A is a first partial view of an illustrative fifth user interface configured to carry out steps of the method of FIG. 3.
Figure 9B:
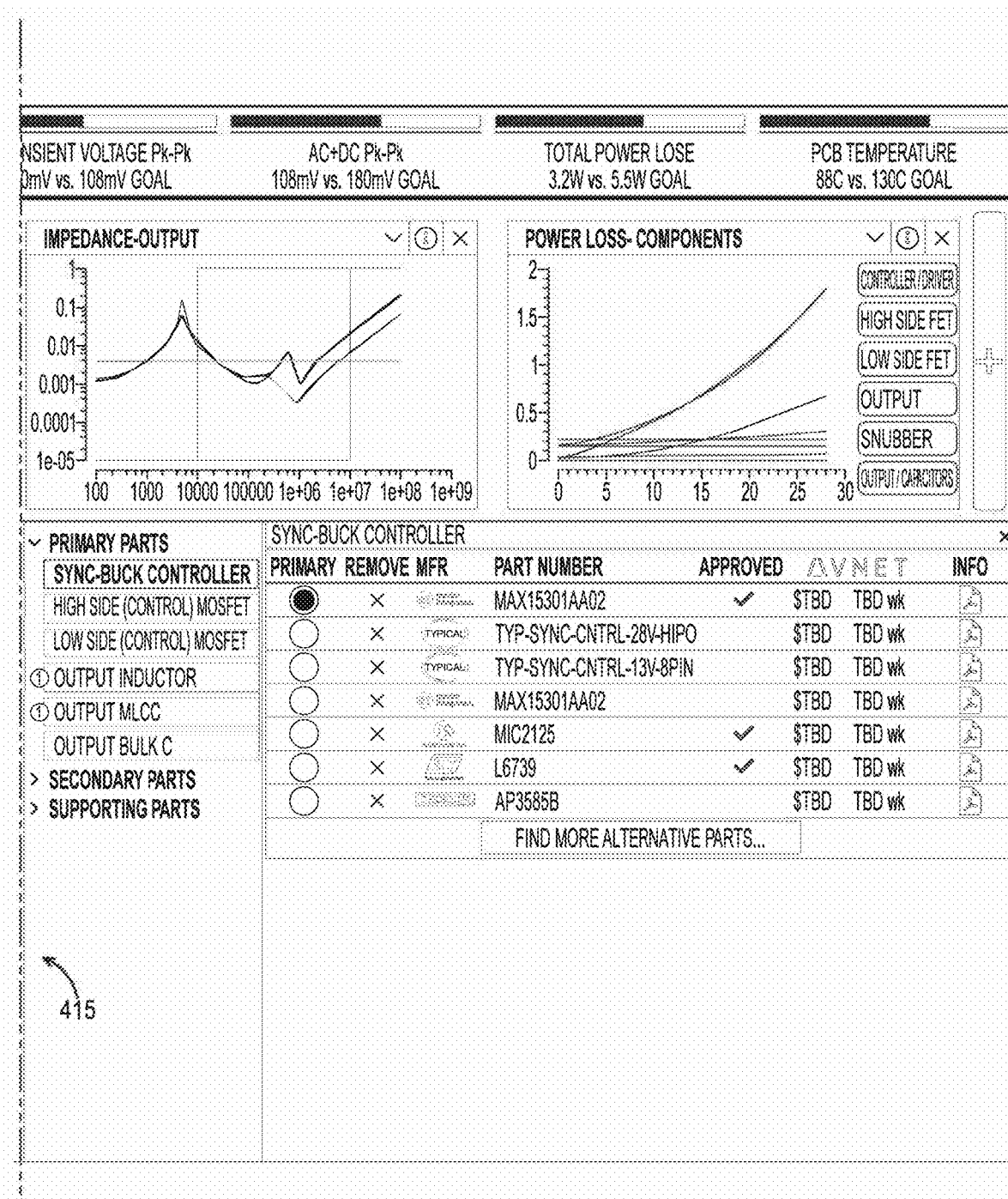
FIG. 9B is a second partial view of the illustrative fifth user interface.

At step 312, the user selects a solution from list 402 and is presented with a detailed analysis 414 (see FIGS. 9A and 9B) of the solution and the option to further customize the solution based on desired attributes, e.g., vendor specific components or a certain PCB layout. In the UI example of FIGS. 8A and 8B, the user selects a solution using a drop-down parts list 412 with associated manufacturers and a schematic view of the circuit for each of the presented solutions. When the user selects their desired solution, they are presented with the detailed analysis 414 of the solution, as shown in the example of FIGS. 9A and 9B. The user may then further customize the specific solution, for example by replacing individual components or changing the layout of a PCB as shown generally at 415. For example, the user may approve of the overall solution but require the use of a specific vendor and/or manufacturer for certain components. Electronics design aid 106 automatically analyzes and updates the displayed analytical data 414 dynamically (e.g., in real time or near real time) in response to user customization.

Figure 10A:
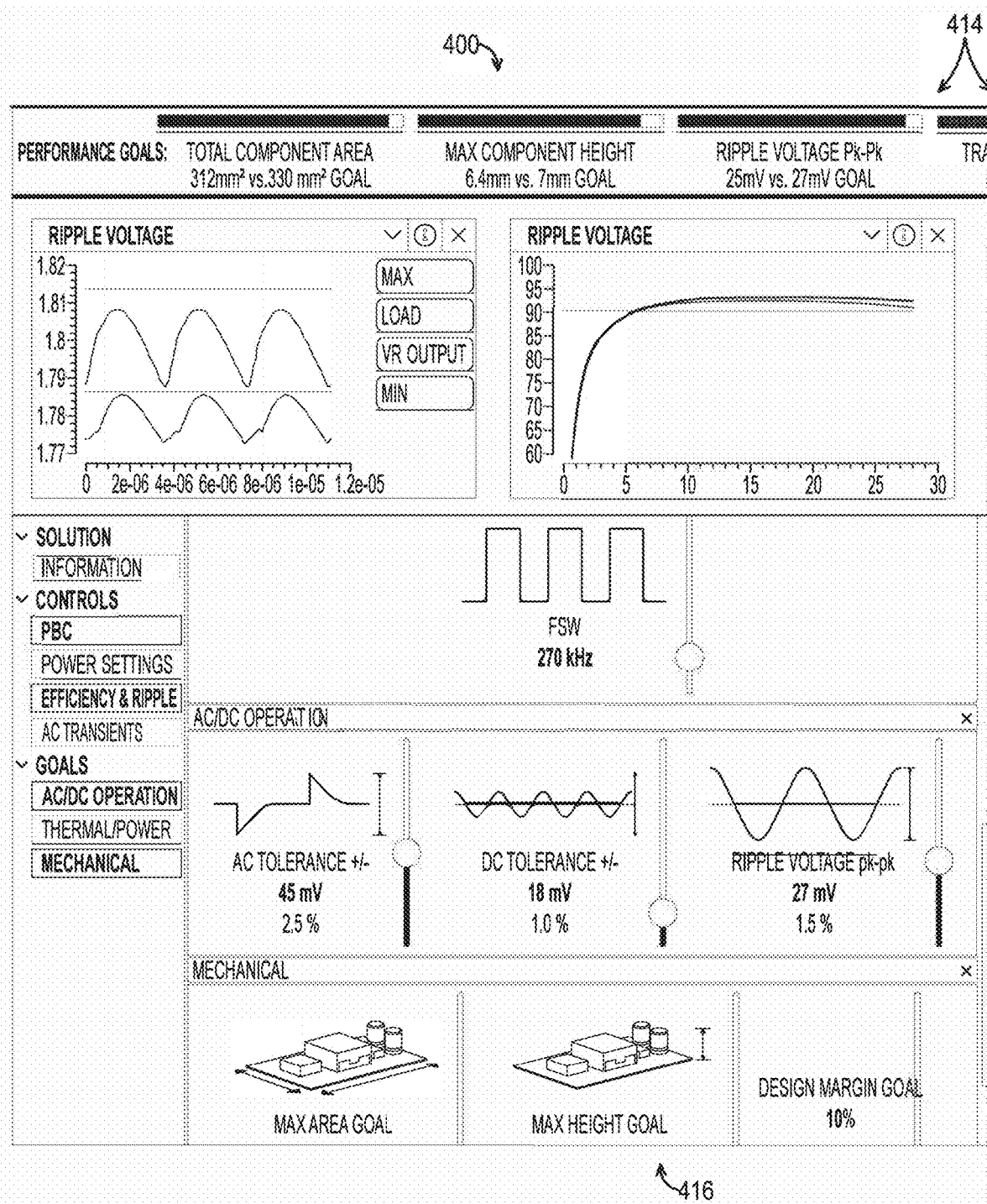
FIG. 10A is a first partial view of an illustrative sixth user interface configured to carry out steps of the method of FIG. 3.
Figure 10B:
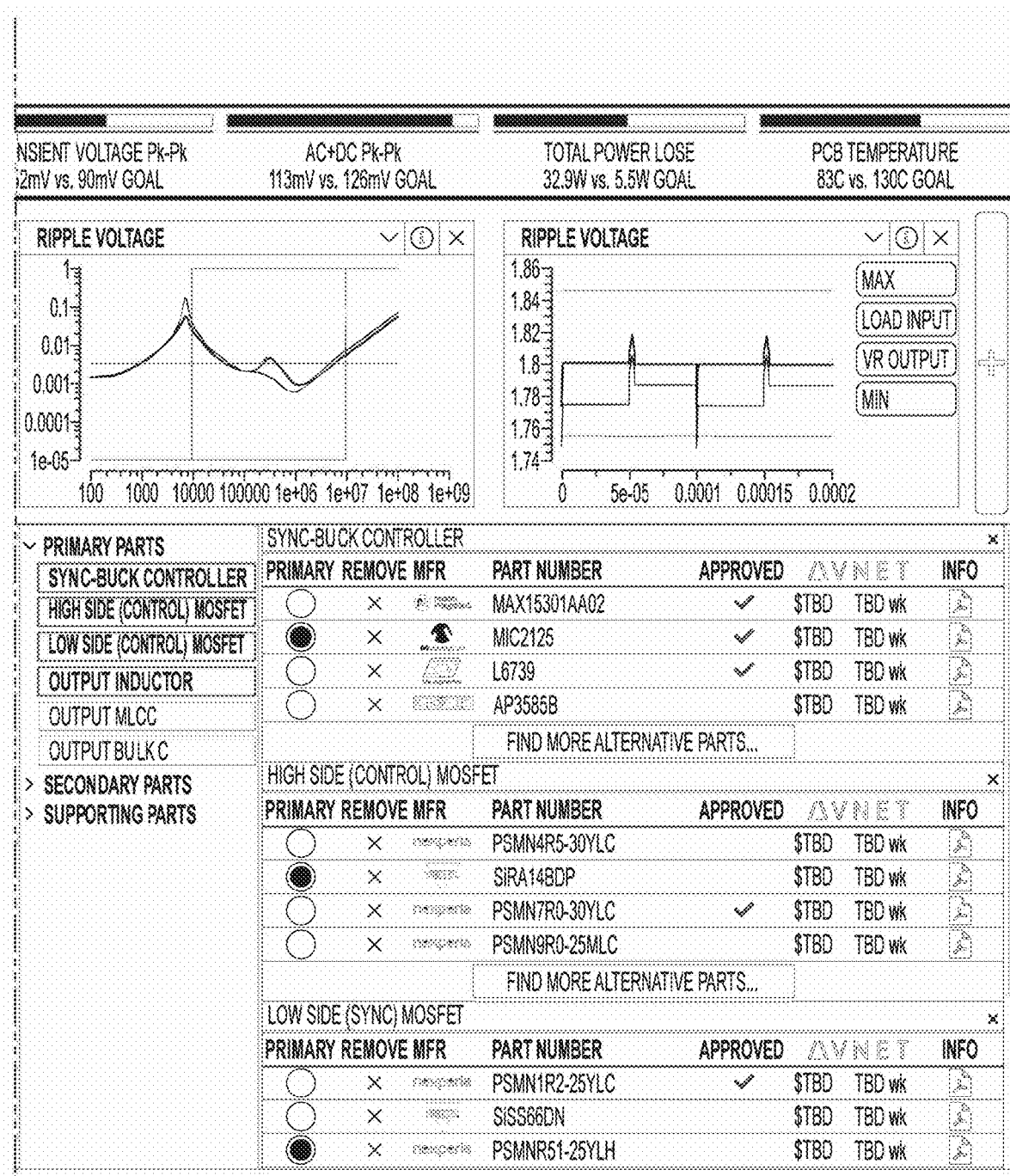
FIG. 10B is a second partial view of the illustrative sixth user interface.

At step 314 of method 300, electronics design aid 106 verifies and finalizes the selection. This step may include the option for the user to access stored data for each component as well as further calculate the behavior of the combination of components according to the accessed data. Additionally, the user may be able to view the respective manufacturer(s) of each component and their associated trust score as described in the previous section. In the example of FIGS. 10A and 10B, the user can make final adjustments to operating conditions, e.g., using slider elements 416 of UI 400, and electronics design aid 106 is configured to automatically flag an incompatibility with the chosen solution. Additionally, electronics design aid may identify if a chosen component has been designated as problematic by one or more of the AI modules described above (or by another user). In the finalization stage of this step, electronics design aid 106 outputs the chosen solution, for example in a specific format (e.g., CAD) for use with another program.

C. Illustrative Data Processing System

Figure 11:
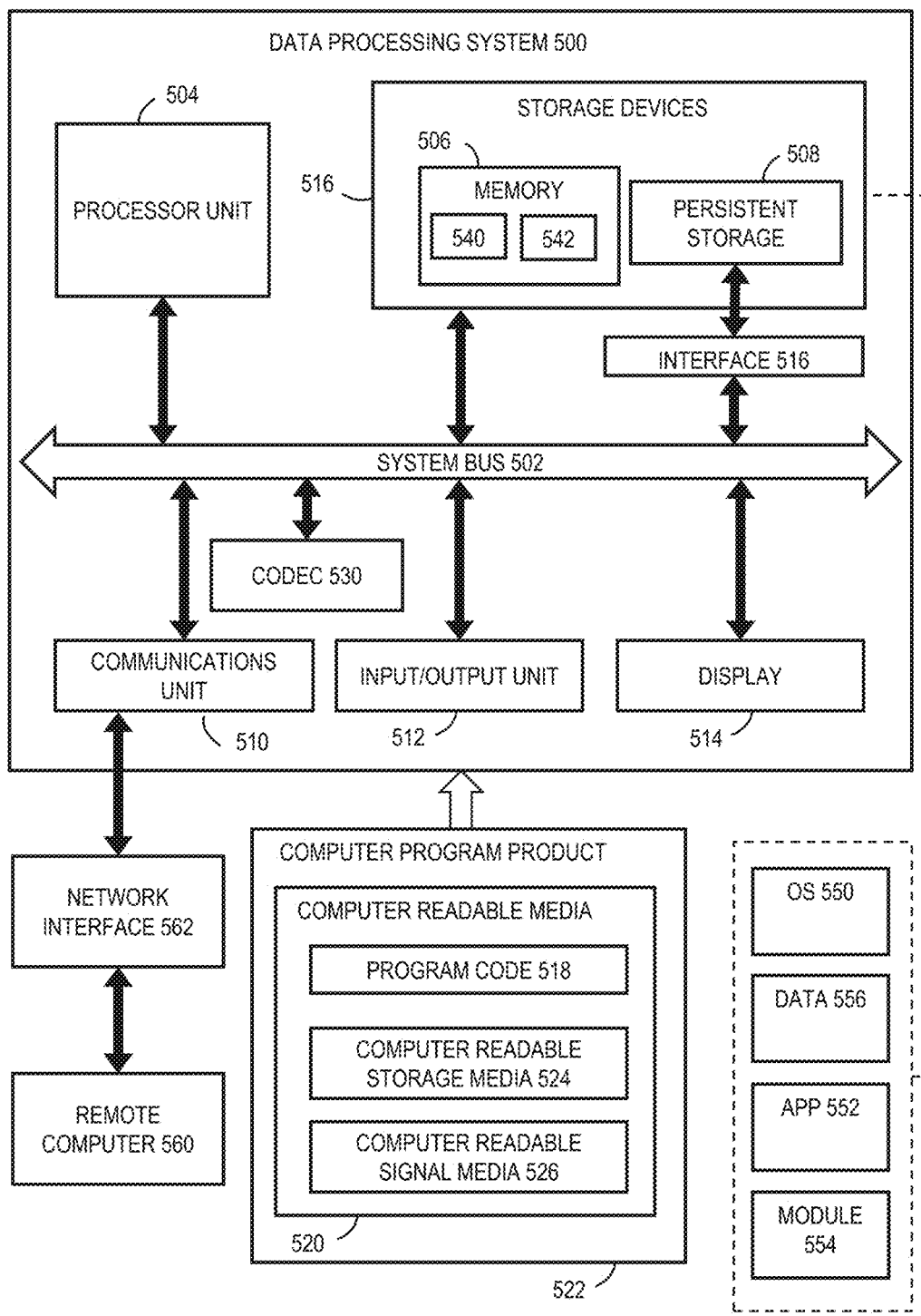
FIG. 11 is a schematic view of an illustrative data processing system suitable for use with aspects of the present disclosure.

As shown in FIG. 11, this example describes a data processing system 500 (also referred to as a computer, computing system, and/or computer system) in accordance with aspects of the present disclosure. In this example, data processing system 500 is an illustrative data processing system suitable for implementing aspects of the interactive system for guiding electronics design and assembly. More specifically, in some examples, devices that are embodiments of data processing systems (e.g., smartphones, tablets, personal computers) may be configured to process aspects of the electronics design aid and distributed framework described in previous sections. In some examples, devices that are embodiments of data processing systems may be configured to run one or more instances of the electronics design aid and/or may be configured to run one or more applications hosted by the distributed framework.

In this illustrative example, data processing system 500 includes a system bus 502 (also referred to as communications framework). System bus 502 may provide communications between a processor unit 504 (also referred to as a processor or processors), a memory 506, a persistent storage 508, a communications unit 510, an input/output (I/O) unit 512, a codec 530, and/or a display 514. Memory 506, persistent storage 508, communications unit 510, input/output (I/O) unit 512, display 514, and codec 530 are examples of resources that may be accessible by processor unit 504 via system bus 502.

Processor unit 504 serves to run instructions that may be loaded into memory 506. Processor unit 504 may comprise a number of processors, a multi-processor core, and/or a particular type of processor or processors (e.g., a central processing unit (CPU), graphics processing unit (GPU), etc.), depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device may include any suitable hardware capable of storing information (e.g., digital information), such as data, program code in functional form, and/or other suitable information, either on a temporary basis or a permanent basis.

Storage devices 516 also may be referred to as computer-readable storage devices or computer-readable media. Memory 506 may include a volatile storage memory 540 and a non-volatile memory 542. In some examples, a basic input/output system (BIOS), containing the basic routines to transfer information between elements within the data processing system 500, such as during start-up, may be stored in non-volatile memory 542. Persistent storage 508 may take various forms, depending on the particular implementation.

Persistent storage 508 may contain one or more components or devices. For example, persistent storage 508 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 508 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 508 to system bus 502, a removable or non-removable interface is typically used, such as interface 528.

Input/output (I/O) unit 512 allows for input and output of data with other devices that may be connected to data processing system 500 (i.e., input devices and output devices). For example, input device 532 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 504 through system bus 502 via interface port(s) 536. Interface port(s) 536 may include, for example, a serial port, a parallel port, a game port, and/or a universal serial bus (USB).

Output devices 534 may use some of the same types of ports, and in some cases the same actual ports, as input device(s) 532. For example, a USB port may be used to provide input to data processing system 500 and to output information from data processing system 500 to an output device 534. Output adapter 538 is provided to illustrate that there are some output devices 534 (e.g., monitors, speakers, and printers, among others) which require special adapters. Output adapters 538 may include, e.g., video and sounds cards that provide a means of connection between the output device 534 and system bus 502. Other devices and/or systems of devices may provide both input and output capabilities, such as remote computer(s) 560. Display 514 may include any suitable human-machine interface or other mechanism configured to display information to a user, e.g., a CRT, LED, or LCD monitor or screen, etc.

Communications unit 510 refers to any suitable hardware and/or software employed to provide for communications with other data processing systems or devices. While communication unit 510 is shown inside data processing system 500, it may in some examples be at least partially external to data processing system 500. Communications unit 510 may include internal and external technologies, e.g., modems (including regular telephone grade modems, cable modems, and DSL modems), ISDN adapters, and/or wired and wireless Ethernet cards, hubs, routers, etc. Data processing system 500 may operate in a networked environment, using logical connections to one or more remote computers 560. A remote computer(s) 560 may include a personal computer (PC), a server, a router, a network PC, a workstation, a microprocessor-based appliance, a peer device, a smart phone, a tablet, another network note, and/or the like. Remote computer(s) 560 typically include many of the elements described relative to data processing system 500. Remote computer(s) 560 may be logically connected to data processing system 500 through a network interface 562 which is connected to data processing system 500 via communications unit 510. Network interface 562 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 530 may include an encoder, a decoder, or both, comprising hardware, software, or a combination of hardware and software. Codec 530 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 530 is depicted as a separate component, codec 530 may be contained or implemented in memory, e.g., non-volatile memory 542.

Non-volatile memory 542 may include read only memory (ROM), programmable ROM (PROM), electrically programmable ROM (EPROM), electrically erasable programmable ROM (EEPROM), flash memory, and/or the like, or any combination of these. Volatile memory 540 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 516, which are in communication with processor unit 504 through system bus 502. In these illustrative examples, the instructions are in a functional form in persistent storage 508. These instructions may be loaded into memory 506 for execution by processor unit 504. Processes of one or more embodiments of the present disclosure may be performed by processor unit 504 using computer-implemented instructions, which may be located in a memory, such as memory 506.

These instructions are referred to as program instructions, program code, computer usable program code, or computer-readable program code executed by a processor in processor unit 504. The program code in the different embodiments may be embodied on different physical or computer-readable storage media, such as memory 506 or persistent storage 508. Program code 518 may be located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may comprise computer-readable storage media 524 or computer-readable signal media 526.

Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

In these examples, computer-readable storage media 524 is a non-transitory, physical or tangible storage device used to store program code 518 rather than a medium that propagates or transmits program code 518. Computer-readable storage media 524 is also referred to as a computer-readable tangible storage device or a computer-readable physical storage device. In other words, computer-readable storage media 524 is media that can be touched by a person.

Alternatively, program code 518 may be transferred to data processing system 500, e.g., remotely over a network, using computer-readable signal media 526. Computer-readable signal media 526 may be, for example, a propagated data signal containing program code 518. For example, computer-readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer-readable signal media 526 for use within data processing system 500. For instance, program code stored in a computer-readable storage medium in a server data processing system may be downloaded over a network from the server to data processing system 500. The computer providing program code 518 may be a server computer, a client computer, or some other device capable of storing and transmitting program code 518.

In some examples, program code 518 may comprise an operating system (OS) 550. Operating system 550, which may be stored on persistent storage 508, controls and allocates resources of data processing system 500. One or more applications 552 take advantage of the operating system's management of resources via program modules 554, and program data 556 stored on storage devices 516. OS 550 may include any suitable software system configured to manage and expose hardware resources of computer 500 for sharing and use by applications 552. In some examples, OS 550 provides application programming interfaces (APIs) that facilitate connection of different type of hardware and/or provide applications 552 access to hardware and OS services. In some examples, certain applications 552 may provide further services for use by other applications 552, e.g., as is the case with so-called "middleware." Aspects of present disclosure may be implemented with respect to various operating systems or combinations of operating systems.

The different components illustrated for data processing system 500 are not meant to provide architectural limitations to the manner in which different embodiments may be implemented. One or more embodiments of the present disclosure may be implemented in a data processing system that includes fewer components or includes components in addition to and/or in place of those illustrated for computer 500. Other components shown in FIG. 11 can be varied from the examples depicted. Different embodiments may be implemented using any hardware device or system capable of running program code. As one example, data processing system 500 may include organic components integrated with inorganic components and/or may be comprised entirely of organic components (excluding a human being). For example, a storage device may be comprised of an organic semiconductor.

In some examples, processor unit 504 may take the form of a hardware unit having hardware circuits that are specifically manufactured or configured for a particular use, or to produce a particular outcome or progress. This type of hardware may perform operations without needing program code 518 to be loaded into a memory from a storage device to be configured to perform the operations. For example, processor unit 504 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 518) may be implemented as hardware, e.g., by specifying an FPGA configuration using a hardware description language (HDL) and then using a resulting binary file to (re)configure the FPGA.

In another example, data processing system 500 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, system bus 502 may comprise one or more buses, such as a system bus or an input/output bus. Of course, the bus system may be implemented using any suitable type of architecture that provides for a transfer of data between different components or devices attached to the bus system. System bus 502 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in system bus 502.

D. Illustrative Distributed Data Processing System

Figure 12:
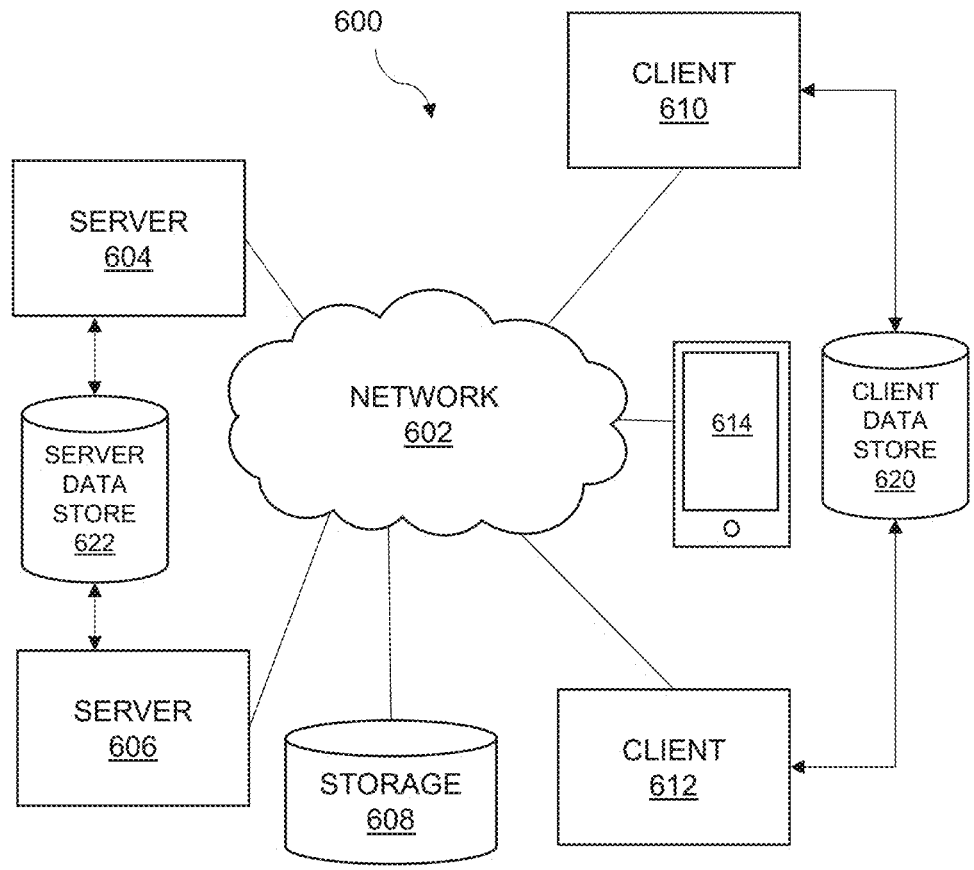
FIG. 12 is a schematic view of an illustrative computer network suitable for use with aspects of the present disclosure.

As shown in FIG. 12, this example describes a general network data processing system 600, interchangeably termed a computer network, a network system, a distributed data processing system, or a distributed network, aspects of which may be included in one or more illustrative embodiments of the interactive system for guiding electronics design and assembly. For example, aspect of the electronics design aid may communicate with the distributed framework over a distributed network.

It should be appreciated that FIG. 12 is provided as an illustration of one implementation and is not intended to imply any limitation with regard to environments in which different embodiments may be implemented. Many modifications to the depicted environment may be made.

Network system 600 is a network of devices (e.g., computers), each of which may be an example of data processing system 500, and other components. Network data processing system 600 may include network 602, which is a medium configured to provide communications links between various devices and computers connected within network data processing system 600. Network 602 may include connections such as wired or wireless communication links, fiber optic cables, and/or any other suitable medium for transmitting and/or communicating data between network devices, or any combination thereof.

In the depicted example, a first network device 604 and a second network device 606 connect to network 602, as do one or more computer-readable memories or storage devices 608. Network devices 604 and 606 are each examples of data processing system 500, described above. In the depicted example, devices 604 and 606 are shown as server computers, which are in communication with one or more server data store(s) 622 that may be employed to store information local to server computers 604 and 606, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 610 and 612 and/or a client smart device 614, may connect to network 602. Each of these devices is an example of data processing system 500, described above regarding FIG. 11. Client electronic devices 610, 612, and 614 may include, for example, one or more personal computers, network computers, and/or mobile computing devices such as personal digital assistants (PDAs), smart phones, handheld gaming devices, wearable devices, and/or tablet computers, and the like. In the depicted example, server 604 provides information, such as boot files, operating system images, and applications to one or more of client electronic devices 610, 612, and 614. Client electronic devices 610, 612, and 614 may be referred to as "clients" in the context of their relationship to a server such as server computer 604. Client devices may be in communication with one or more client data store(s) 620, which may be employed to store information local to the clients (e.g., cookie(s) and/or associated contextual information). Network data processing system 600 may include more or fewer servers and/or clients (or no servers or clients), as well as other devices not shown.

In some examples, first client electric device 610 may transfer an encoded file to server 604. Server 604 can store the file, decode the file, and/or transmit the file to second client electric device 612. In some examples, first client electric device 610 may transfer an uncompressed file to server 604 and server 604 may compress the file. In some examples, server 604 may encode text, audio, and/or video information, and transmit the information via network 602 to one or more clients.

Client smart device 614 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 600 may be stored in or on a computer-readable storage medium, such as network-connected storage device 608 and/or a persistent storage 508 of one of the network computers, as described above, and may be downloaded to a data processing system or other device for use. For example, program code may be stored on a computer-readable storage medium on server computer 604 and downloaded to client 610 over network 602, for use on client 610. In some examples, client data store 620 and server data store 622 reside on one or more storage devices 608 and/or 508.

Network data processing system 600 may be implemented as one or more of different types of networks. For example, system 600 may include an intranet, a local area network (LAN), a wide area network (WAN), or a personal area network (PAN). In some examples, network data processing system 600 includes the Internet, with network 602 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 602 may be referred to as a "cloud." In those examples, each server 604 may be referred to as a cloud computing node, and client electronic devices may be referred to as cloud consumers, or the like. FIG. 12 is intended as an example, and not as an architectural limitation for any illustrative embodiments.

E. Selected Embodiments and Claim Concepts

This section describes additional aspects and features of an interactive system for guiding electronics design and assembly, presented without limitation as a series of paragraphs, some or all of which may be alphanumerically designated for clarity and efficiency. Each of these paragraphs can be combined with one or more other paragraphs, and/or with disclosure from elsewhere in this application, including any attached Appendices, in any suitable manner. Some of the paragraphs below may expressly refer to and further limit other paragraphs, providing without limitation examples of some of the suitable combinations.

A0. A computer implemented method for electronics design, the method comprising:
  receiving, via a graphical user interface (GUI), first information relating to a requested electronic circuit, the first information including a selected type of electronic circuit and one or more operating criteria relating to requested fundamental functionality of the selected type of electronic circuit;
  receiving, via the GUI, second information relating to requested secondary attributes of a hypothetical candidate electronic circuit that satisfies the first information;
  displaying, via the GUI, a set of candidate circuit architectures satisfying the first information, and a visualization of how each of the candidate circuit architectures relates to the second information;
  receiving, via the GUI, a user selection from the set of candidate circuit architectures to define a selected circuit architecture; and displaying, via the GUI, detailed information regarding the selected circuit architecture, including a simulation of electronic behavior of the selected circuit architecture and a listing of specific components included in the selected circuit architecture.

A1. The method of A0, further comprising:

receiving, via the GUI, at least one change to one of the specific components, and in response verifying whether the selected circuit architecture continues to satisfy the first information and the second information.

A2. The method of A0 or A1, further comprising:

receiving, via the GUI, at least one change to a physical layout of the selected circuit architecture, and in response verifying whether the selected circuit architecture continues to satisfy the first information and the second information.

A3. The method of any one of paragraphs A0 through A2, wherein the listing of specific components includes vendor-specific information relating to each of the specific components.

A4. The method of any one of paragraphs A0 through A3, wherein the one or more operating criteria relating to desired fundamental functionality include a specific voltage input and/or a specific voltage output.

A5. The method of any one of paragraphs A0 through A4, wherein the selected secondary attributes include a maximum operating temperature.

A6. The method of any one of paragraphs A0 through A5, wherein the selected secondary attributes include a maximum overall printed circuit board (PCB) dimension.

A7. The method of A6, wherein the overall PCB dimension is an area.

A8. The method of A6, wherein the overall PCB dimension is a height.

A9. The method of any one of paragraphs A0 through A8, wherein the visualization comprises:

one or more bar charts, each of the bar charts corresponding to a respective one of the secondary attributes, and each bar at a given relative position in each of the bar charts representing a corresponding value of the secondary attribute for a respective one of the candidate circuit architectures;

wherein each of the bar charts further includes a visual indication of a desired value for the corresponding secondary attribute, such that each bar chart shows a relative compliance of each of the candidate circuit architectures with the corresponding secondary attribute.

A10. The method of any one of paragraphs A0 through A9, further comprising ordering the specific components from respective vendors.

A11. The method of any one of paragraphs A0 through A10, further comprising displaying trust-related information relating to at least one of the specific components, the trust-related information being provided by a different user.

A12. The method of any one of paragraphs A0 through A11, wherein displaying detailed information regarding the selected circuit architecture further includes simulating expected electronic behavior of the selected circuit architecture and displaying information relating to the simulated behavior.

B0. A data processing system for designing electronics, the system comprising:

one or more processors;

a memory; and an electronics design program including a plurality of instructions stored in the memory and executable by the one or more processors to:

receive, via a graphical user interface (GUI), first information relating to a requested electronic circuit, the first information including a selected type of electronic circuit and one or more operating criteria relating to requested fundamental functionality of the selected type of electronic circuit;

receive, via the GUI, second information relating to requested secondary attributes of a hypothetical candidate electronic circuit that satisfies the first information;

display, via the GUI, a set of candidate circuit architectures satisfying the first information, and a visualization of how each of the candidate circuit architectures relates to the second information;

receive, via the GUI, a user selection from the set of candidate circuit architectures to define a selected circuit architecture; and display, via the GUI, detailed information regarding the selected circuit architecture, including a simulation of electronic behavior of the selected circuit architecture and a listing of specific components included in the selected circuit architecture.

B1. The system of B0, wherein the plurality of instructions are further executable to:

receive, via the GUI, at least one change to one of the specific components, and in response verify whether the selected circuit architecture continues to satisfy the first information and the second information.

B2. The system of B0 or B1, wherein the plurality of instructions are further executable to:

receive, via the GUI, at least one change to a physical layout of the selected circuit architecture, and in response verify whether the selected circuit architecture continues to satisfy the first information and the second information.

B3. The system of any one of paragraphs B0 through B2, wherein the one or more operating criteria relating to desired fundamental functionality include a specific voltage input and/or a specific voltage output.

B4. The system of any one of paragraphs B0 through B3, wherein the selected secondary attributes include a maximum operating temperature.

B5. The system of any one of paragraphs B0 through B4, wherein the selected secondary attributes include a maximum overall printed circuit board (PCB) dimension.

B6. The system of any one of paragraphs B0 through B5, wherein displaying the visualization comprises:

presenting one or more bar charts, each of the bar charts corresponding to a respective one of the secondary attributes, and each bar at a given relative position in each of the bar charts representing a corresponding value of the secondary attribute for a respective one of the candidate circuit architectures;

wherein each of the bar charts further includes a visual indication of a desired value for the corresponding secondary attribute, such that each bar chart shows a relative compliance of each of the candidate circuit architectures with the corresponding secondary attribute.

B7. The system of any one of paragraphs B0 through B6, further comprising displaying trust-related information relating to at least one of the specific components, the trust-related information being provided by a different user.

C0. A data processing framework configured to host applications for designing electronics, the data process framework comprising:

a cloud system hosted on one or more remote servers, the cloud system including:
- a memory including a central database comprising data on electronics components; and
- a central AI module;
- one or more data isolation nodes, each data isolation node distributed across a plurality of data processing systems, each data isolation node comprising:
  - a corporate AI module as described herein in network communication with a plurality of context AI modules as described herein, each context AI module hosted on a unique one of the plurality of data processing systems; and
  - a local database having a portion of the data from the central database;
- wherein the cloud system and the one or more data isolation nodes are in network communication through a security filter.

C1. The data processing framework of paragraph C0, wherein the security filter comprises an end-to-end encryption algorithm.

C2. The data processing framework of any one of paragraphs C0 through C1 further comprising a trust AI module as described herein.

C3. The data processing framework of any one of paragraphs C0 through C2 further comprising a data processing system for designing electronics (i.e., a design aid) in accordance with any one of paragraphs B0 through B7 and/or implementing the method of any one of paragraphs A0 through A12, e.g., hosted on each computer in each data isolation node in communication with each context AI and the local database.

C4. The data processing framework of C3, wherein the corporate AI aggregates from each instance of the design aid.

Advantages, Features, and Benefits

The different embodiments and examples of the interactive system for guiding electronics design and assembly described herein provide several advantages over known solutions for guiding the design and assembly of electronics. For example, illustrative embodiments and examples described herein allow for easier and faster development of electronics.

Additionally, and among other benefits, illustrative embodiments and examples described herein include a useful and time-saving UI which provides a visualization of candidate circuit architectures compared to desired attributes all in one place, and enables the user to compare and consider trade-offs between such desired attributes. This can produce a much-improved electronic design as compared with one strictly adhering to the originally entered attributes. No known user interfaces include this feature.

Additionally, and among other benefits, illustrative embodiments and examples described herein allow for real-time analysis of electronics having selectable components.

Additionally, and among other benefits, illustrative embodiments and examples described herein allow a comprehensive global analysis of the electronics industry.

Additionally, and among other benefits, illustrative embodiments and examples described herein allow a personalized design tool that adaptively learns from the user.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer implemented method for electronics design, the method comprising:
   - receiving, via a graphical user interface (GUI), first information relating to a requested hypothetical electronic circuit, the first information including a selected type of electronic circuit assembly and one or more operating criteria relating to requested fundamental functionality of the selected type of electronic circuit assembly;
   - receiving, via the GUI, second information relating to requested secondary attributes of the requested hypothetical electronic circuit;
   - for each one of a plurality of subtypes of the selected type of electronic circuit assembly: simultaneously displaying, via the GUI, a plurality of candidate circuit assemblies satisfying the first information, wherein each of the candidate circuit assemblies comprises a respective configuration of circuit components, and a plurality of graphical visualizations, each of the plurality of graphical visualizations displaying how each of the plurality of candidate circuit assemblies relates to a respective secondary attribute of the second information;
   - receiving, via the GUI, a user selection from the plurality of candidate circuit assemblies to define a selected circuit assembly; and
   - displaying, via the GUI, detailed information regarding the selected circuit assembly, including a listing of specific components included in the selected circuit assembly.

2. The method of claim 1, wherein displaying detailed information regarding the selected circuit assembly further includes simulating expected electronic behavior of the selected circuit assembly and displaying information relating to the simulated behavior.

3. The method of claim 1, further comprising:
   - receiving, via the GUI, at least one change to one of the specific components, and in response verifying whether the selected circuit assembly continues to satisfy the first information and the second information.

4. The method of claim 1, further comprising:
   - receiving, via the GUI, at least one change to a physical layout of the selected circuit assembly, and in response verifying whether the selected circuit assembly continues to satisfy the first information and the second information.

5. The method of claim 1, wherein the listing of specific components includes vendor-specific information relating to each of the specific components.

6. The method of claim 1, wherein the one or more operating criteria relating to desired fundamental functionality include a specific voltage input and/or a specific voltage output.

7. The method of claim 1, wherein the requested secondary attributes include a maximum operating temperature.

8. The method of claim 1, wherein the requested secondary attributes include a maximum overall printed circuit board (PCB) dimension.

9. The method of claim 8, wherein the overall PCB dimension is an area.

10. The method of claim 8, wherein the overall PCB dimension is a height.

11. The method of claim 1, wherein the plurality of graphical visualizations comprises:
one or more bar charts, each of the bar charts corresponding to a respective one of the secondary attributes, and each bar at a given relative position in each of the bar charts representing a corresponding value of the secondary attribute for a respective one of the candidate circuit assemblies;
wherein each of the bar charts further includes a visual indication of a desired value for the corresponding secondary attribute, such that each bar chart shows a relative compliance of each of the candidate circuit assemblies with the corresponding secondary attribute.

12. The method of claim 1, further comprising ordering the specific components from respective vendors.

13. The method of claim 1, further comprising displaying trust-related information relating to at least one of the specific components, the trust-related information being provided by a different user.

14. A data processing system for designing electronics, the system comprising:
one or more processors;
a memory; and
an electronics design program including a plurality of instructions stored in the memory and executable by the one or more processors to:
receive, via a graphical user interface (GUI), first information relating to a requested hypothetical electronic circuit, the first information including a selected type of electronic circuit assembly and one or more operating criteria relating to requested fundamental functionality of the selected type of electronic circuit;
receive, via the GUI, second information relating to requested secondary attributes of the requested hypothetical electronic circuit that satisfies the first information;
for each one of a plurality of subtypes of the selected type: simultaneously display, via the GUI, a set of candidate circuit assemblies satisfying the first information, wherein each of the candidate circuit assemblies comprises a respective configuration of circuit components, and a plurality of graphical visualizations, each of the plurality of graphical visualizations corresponding to how each of the candidate circuit assemblies relates to the second information;
receive, via the GUI, a user selection from the set of candidate circuit assemblies to define a selected circuit assembly and
display, via the GUI, detailed information regarding the selected circuit assembly, including a simulation of electronic behavior of the selected circuit assembly and a listing of specific components included in the selected circuit assembly.

15. The system of claim 14, wherein the plurality of instructions are further executable to:
receive, via the GUI, at least one change to one of the specific components, and in response verify whether the selected circuit assembly continues to satisfy the first information and the second information.

16. The system of claim 14, wherein the plurality of instructions are further executable to:
receive, via the GUI, at least one change to a physical layout of the selected circuit assembly, and in response verify whether the selected circuit assembly continues to satisfy the first information and the second information.

17. The system of claim 14, wherein the one or more operating criteria relating to desired fundamental functionality include a specific voltage input and/or a specific voltage output.

18. The system of claim 14, wherein the requested secondary attributes include a maximum overall printed circuit board (PCB) dimension.

19. The system of claim 14, wherein displaying the plurality of graphical visualizations comprises:
presenting one or more bar charts, each of the bar charts corresponding to a respective one of the secondary attributes, and each bar at a given relative position in each of the bar charts representing a corresponding value of the secondary attribute for a respective one of the candidate circuit assemblies;
wherein each of the bar charts further includes a visual indication of a desired value for the corresponding secondary attribute, such that each bar chart shows a relative compliance of each of the candidate circuit assemblies with the corresponding secondary attribute.

20. The system of claim 14, wherein the plurality of instructions are further executable to:
simulate expected electronic behavior of the selected circuit assembly and display information relating to the simulated behavior on the GUI.

* * * * *